(12) United States Patent
Wan

(10) Patent No.: US 7,656,859 B2
(45) Date of Patent: *Feb. 2, 2010

(54) INTERNAL SUBSTITUTION BI-LEVEL ADDRESSING FOR COMPATIBLE PUBLIC NETWORKS

(75) Inventor: Albert Chungbor Wan, Austin, TX (US)

(73) Assignee: AT&T Labs, Inc., Austin, TX (US)

( * ) Notice: Subject to any disclaimer, the term of this patent is extended or adjusted under 35 U.S.C. 154(b) by 513 days.

This patent is subject to a terminal disclaimer.

(21) Appl. No.: 11/408,922

(22) Filed: Apr. 24, 2006

(65) Prior Publication Data

US 2006/0209823 A1    Sep. 21, 2006

Related U.S. Application Data

(63) Continuation of application No. 09/947,510, filed on Sep. 7, 2001, now Pat. No. 7,092,390.

(60) Provisional application No. 60/230,800, filed on Sep. 7, 2000.

(51) Int. Cl.
  *H04L 12/28* (2006.01)
  *G06F 15/16* (2006.01)
  *G06F 15/173* (2006.01)

(52) U.S. Cl. .................... 370/351; 370/395.1; 370/392; 709/219; 709/238

(58) Field of Classification Search .............. 370/400, 370/389, 390, 392, 395.1, 395.2, 395.4, 352, 370/412, 395.5; 709/218, 249, 238, 245
See application file for complete search history.

(56) References Cited

U.S. PATENT DOCUMENTS 5,600,644 A    2/1997    Chang et al.

(Continued)

FOREIGN PATENT DOCUMENTS

WO    99/29137    6/1999

(Continued)

OTHER PUBLICATIONS

Specification for RFC 1034, entitled: "Domain Names-Concepts and Facilities", Nov. 1987.

(Continued)

*Primary Examiner*—Hanh Nguyen
(74) *Attorney, Agent, or Firm*—Greenblum & Bernstein, P.L.C.

(57) ABSTRACT

A computer readable medium stores a program in an ingress capable network device of a network for routing signals through the network. The computer readable includes a receiving code segment for receiving an original signal, which has an embedded destination service address. The computer readable medium also includes a querying code segment for querying a database server to obtain an internal routing address corresponding to the embedded destination service address, and a routing code segment for routing at least a portion of the original signal through the network to an egress capable network device according to the internal routing address. The routed portion of the original signal includes at least the embedded destination service address, which enables the egress capable network device to restore the embedded destination service address and to forward the routed portion of the original signal from the network.

19 Claims, 9 Drawing Sheets

U.S. PATENT DOCUMENTS

| | | | |
|---|---|---|---|
| 5,633,869 A | | 5/1997 | Burnett et al. |
| 5,737,333 A | * | 4/1998 | Civanlar et al. ............ 370/352 |
| 5,757,796 A | | 5/1998 | Hebb |
| 5,781,529 A | | 7/1998 | Liang et al. |
| 5,809,025 A | | 9/1998 | Timbs |
| 5,828,844 A | * | 10/1998 | Civanlar et al. ............ 709/228 |
| 5,835,710 A | | 11/1998 | Nagami et al. |
| 5,892,763 A | | 4/1999 | Laraqui et al. |
| 5,903,559 A | | 5/1999 | Acharya et al. |
| 5,930,477 A | | 7/1999 | Uchida |
| 5,936,959 A | | 8/1999 | Joffe |
| 5,940,394 A | | 8/1999 | Killian |
| 5,940,396 A | | 8/1999 | Rochberger |
| 5,946,313 A | | 8/1999 | Allan et al. |
| 5,949,782 A | | 9/1999 | Wells |
| 5,958,018 A | | 9/1999 | Eng et al. |
| 5,983,332 A | | 11/1999 | Watkins |
| 5,991,854 A | | 11/1999 | Watkins |
| 6,016,319 A | | 1/2000 | Kshirsagar et al. |
| 6,021,263 A | | 2/2000 | Kujoory et al. |
| 6,034,958 A | | 3/2000 | Wicklund |
| 6,078,586 A | | 6/2000 | Dugan et al. |
| 6,081,836 A | | 6/2000 | Karapetkov et al. |
| 6,111,881 A | | 8/2000 | Soncodi |
| 6,122,670 A | | 9/2000 | Bennett et al. |
| 6,138,144 A | | 10/2000 | DeSimone et al. |
| 6,195,364 B1 | | 2/2001 | Brodigan |
| 6,222,842 B1 | | 4/2001 | Sasyan et al. |
| 6,252,857 B1 | | 6/2001 | Fendick et al. |
| 6,286,049 B1 | | 9/2001 | Rajakareunanayake et al. |
| 6,314,098 B1 | | 11/2001 | Masuda et al. |
| 6,343,322 B2 | | 1/2002 | Nagami et al. |
| 6,343,326 B2 | | 1/2002 | Acharya et al. |
| 6,345,051 B1 | | 2/2002 | Gupta et al. |
| 6,385,170 B1 | | 5/2002 | Chiu et al. |
| 6,456,962 B1 | | 9/2002 | Allingham et al. |
| 6,470,389 B1 | | 10/2002 | Chung et al. |
| 6,496,479 B1 | | 12/2002 | Shionozaki |
| 6,516,417 B1 | | 2/2003 | Pegrum et al. |
| 6,523,068 B1 | * | 2/2003 | Beser et al. ................. 709/238 |
| 6,538,416 B1 | | 3/2003 | Hahne et al. |
| 6,563,794 B1 | | 5/2003 | Takashima et al. |
| 6,598,080 B1 | | 7/2003 | Nagami et al. |
| 6,625,124 B1 | | 9/2003 | Fan et al. |
| 6,751,218 B1 | | 6/2004 | Hagirahim et al. |
| 6,798,782 B1 | | 9/2004 | Caronni et al. |
| 7,065,092 B2 | | 6/2006 | Chen et al. |
| 7,092,390 B2 | * | 8/2006 | Wan ........................... 370/392 |
| 2001/0048683 A1 | | 12/2001 | Allan et al. |
| 2002/0038419 A1 | | 3/2002 | Garrett et al. |
| 2002/0052915 A1 | | 5/2002 | Amin-Salehi |
| 2002/0061011 A1 | | 5/2002 | Wan |
| 2002/0141369 A1 | | 10/2002 | Perras |
| 2002/0196793 A1 | | 12/2002 | Samba et al. |
| 2003/0028671 A1 | | 2/2003 | Mehta et al. |
| 2003/0076854 A1 | | 4/2003 | Mudhar et al. |
| 2003/0088696 A1 | | 5/2003 | McCanne |
| 2004/0022247 A1 | | 2/2004 | Chen et al. |
| 2004/0022250 A1 | | 2/2004 | Chen et al. |
| 2004/0022255 A1 | | 2/2004 | Chen et al. |
| 2005/0025143 A1 | | 2/2005 | Chen et al. |
| 2005/0027834 A1 | | 2/2005 | Chen et al. |

FOREIGN PATENT DOCUMENTS

| | | |
|---|---|---|
| WO | 00/29137 | 5/2000 |
| WO | 00/57296 | 9/2000 |
| WO | 00/76122 | 12/2000 |
| WO | 01/11837 | 2/2001 |
| WO | 01/31829 | 5/2001 |
| WO | 2004/014000 | 2/2004 |

OTHER PUBLICATIONS

Specification for RFC 1035, entitled: "Domain Names-Implementation and Specification", Nov. 1987.
Specification for RFC 1995, entitled: "Incremental Zone Transfer in DNS" Aug. 1996.
Specification for RFC 1996, entitled: "A Mechanism for Prompt Notification of Zone Changes (DNS Notify)" Aug. 1996.
Specification for RFC 2065, entitled: "Domain Name System Security Extensions" Jan. 1997.
Specification for RFC 2136, entitled: "Dynamic Updates in the Domain Name System (DNS Update)", Apr. 1997.
Specification for RFC 2137, entitled: "Secure Domain Name System Dynamic Update", Apr. 1997.
WAN, "ASP Bi-level Addressing & ANS Requirements" (99-0534), dated Sep. 26-Oct. 1, 1999.
WAN, "ASP Bi-level Addressing Architecture" (99-0649), dated Nov. 28-Dec. 4, 1999.
ATM Forum Addressing: Reference Guide (AF-RA-0106.000), The ATM Forum Technical Committee, dated Feb. 1999.
"ATM Forum Addressing: User Guide version 1.0" (AF-RA-0105.000), The ATM Forum Technical Committee, dated Jan. 1999.
"PNNI Transported Address Stack version 1.0" (AF-CS-0115.000), The ATM Forum Technical Committee, dated May 1999.
"New Capabilities ATM Addressing Document (Draft)" (BTD-RA-ADDR-02.03), The ATM Forum Technical Committee, dated Oct. 1998.
"ATM Name System V2.0 Baseline Text" (BTD-SAA-ANS-02.01), The ATM Forum Technical Committee, dated Jul. 1999.
"ATM Bi-Level Addressing Document, Version 1.0" (STR-RA-ADDR-01.00), The ATM Forum Technical Committee, dated Jul. 2000.
"ATM Bi-Level Addressing Document, Version 1.0 (Draft)" (STR-RA-ADDR-01.00), The ATM Forum Technical Committee, dated Jul. 2000.
Abstract of EP 1036450, published on Sep. 20, 2000.
"The Internet Multimedia Conferencing Architecture", by Handley et al., INET '96, Jun. 1996.
"RSVP-ATM QoS Interworking", Cisco IOS Release 12.0 (3), 2001, pp. 1-34.
"RSVP Over ATM Implementation Requirements", by Berger, FORE Systems, Aug. 1998.
"An Overview of ATM", <http://www.rware.demon.co.uk/atm.htm>, 1999.
"QoS Trials on SuperJANET in the Context of HICID and Other BT/JISC Project", by Crowcroft et al., Nov. 14, 1997.
"Extensions to RSVP for QoS IP Over Signaled QoS Network", by Chen et al., SBC Communications, Inc., Apr. 2002.
"Resource Reservation Protocol", Cisco Systems, Inc., published on Feb. 20, 2002.
K. Allen et al., "Ipv6 for Large Access Providers" (Oct. 2002).
U.S. Appl. No. 11/401,931 to Chen et al., filed Apr. 12, 2006.

* cited by examiner

INTERNAL SUBSTITUTION BI-LEVEL ADDRESSING FOR COMPATIBLE PUBLIC NETWORKS

This is a continuation of U.S. patent application Ser. No. 09/947,510, filed on Sep. 7, 2001, now U.S. Pat. No. 7,092,390 which claims the benefit of U.S. Provisional Application No. 60/230,800, filed Sep. 7, 2000, which are expressly incorporated therein by reference in their entirety.

BACKGROUND OF THE INVENTION

1. Field of the Invention

The present invention relates to addressing of network traffic, and more specifically, to addressing for routing various traffic across public networks.

2. Acronyms

The written description provided herein contains acronyms that refer to various telecommunications services, components and techniques, as well as features relating to the present invention. Although some of these acronyms are known, use of these acronyms is not strictly standardized in the art. For purposes of the written description herein, the acronyms are defined as follows:

ASP—ATM Service Provider (a CSP)
    ADP—ATM Destination Point (address)
    ATI—ATM Terminating Interface (address)
    ATM—Asynchronous Transfer Mode
    CO—Central Office
    CPN—Compatible Public Network
    CSP—CPN Service Provider
    DAP—Directory Access Protocol
    DCC—Data Country Code (ISO 3166)
    DNS—Domain Name System (or Server)
    E.164—ITU-T Recommendation E.164, 05/1997
IAR—Inter-ASP Routing
    ICD—International Code Designator
    IP—Internet Protocol
    ISP—Internet Service Provider
    LAN—Local Area Network
    LDAP—Lightweight Directory Access Protocol
    MTLS—Multiprotocol Label Switching
    NAT—Network Address Translation
    NS—Naming System (generic)
    PNNI—Public Network-Network Interface
    RR—Resource Record
    SVC—Switched Virtual Circuit
    SOA—Source of Authority
    TAS—Transported Address Stack
    TAS IE—Transported Address Stack Information Element
    UNI—User-Network Interface
    VPN—Virtual Private Network
    VTOA—Voice Trunking Over ATM
    WAN—Wide Area Network 3. Background Information Traditionally, large-scale broadband networks, often telecommunications networks, perform routing and addressing in a "single-level" fashion. An Asynchronous Transfer Mode network (ATM) is one example of a kind of large-scale broadband network using single-level addressing. When single-level addressing and routing is employed, the calling party and called party must use addresses that have topological significance to the network(s) carrying the traffic. That is, routing according to the address will direct the traffic according to the positional relationship (i.e., in terms of network topology, not necessarily physical topology) of the calling and called parties. Single-level addressing is not scalable to a globally based network.

A monolithic network, public or private, has only one addressing scheme. From any edge of the network, a call can reach any nodes attached to the monolithic network at another edge because there is no address ambiguity. Routing within a monolithic network employs unique addresses that are both native and certain. A compatible public network, if operated under a single addressing scheme, can be treated as a monolithic network. In this case, the compatible public network and users are using the same (public) addressing scheme for routing (port designation) and for service (user designation). Under this scenario, compatible public network switches must propagate signals corresponding to users (possibly represented as end systems or data terminals) throughout the compatible public network's routing mechanism. Although small-scale independent networks can be designed and operated under a monolithic model, this is not the preferred case for large public networks servicing WAN applications.

Where support of multiple addressing schemes is required, a compatible public network may be required to build multiple or parallel monolithic networks that each run on independent addressing. When the demand is not high, a few parallel networks may be established, but as a multiplicity of customers require independent addressing, the number of parallel networks that must be established becomes impractical. Even though a compatible public network may own and operate versatile switches that support more than one addressing scheme, the concurrent operation of independently addressed networks on the same switches, from the addressing perspective, is considered the operation of multiple monolithic networks.

Problems also arise on the user side, where unnecessary confusion and barriers are placed in the overall system, for example, when user A trying to connect to user B must ensure that the respective public networks to which the parties are connected have a compatible addressing scheme and connectivity. Accordingly, from the perspective of a compatible public network, running multiple monolithic networks is not an economical solution.

The issue of multiple monolithic networks becomes more complicated when compatible public networks build additional networks as "islands" connected to the parent network, but with different native addressing schemes. These island networks, usually built as monolithic networks, may use vastly different addressing from each other and from the parent compatible public network. The compatible public network would, of course, require all users connecting to the island networks to use the same addressing scheme as the island. Island-connected users who use different addressing schemes from one another find that interconnections between islands are difficult even thought the interconnection is within the same compatible public network. Naturally, since even intra-public-network island interconnections are challenging, "global" inter-public-network island interconnections are proportionately more difficult. Not only the addressing schemes vary, but also translations between addressing schemes (even when the translation is from and to the same scheme) may also vary, since each compatible public network may choose a proprietary or non-standard translation. Global inter-public-network connections are made more difficult and may become fragmented.

Ideally, the compatible public network should support multiple services and multiple addresses. However, building a carrier scale broadband Wide Area Network (WAN) requires significant resources (engineering, equipment, support, etc.).

As noted, it is not considered economical for compatible public networks to build multiple networks in parallel using different addressing schemes. If communication is difficult or impossible between network islands, services are not fully functional, and therefore not attractive to potential users. In this regard, each compatible public network would be better served with just one broadband backbone network that is capable of supporting all possible services, but that is indifferent as to addressing requirements that those services may have. Services capable of independence from their own addressing scheme should be able to communicate with each other when the addressing scheme is decoupled from the functionality of the services.

BRIEF DESCRIPTION OF THE DRAWINGS

The present invention is further explained in the description which follows with reference to the drawings, illustrating, by way of non-limiting examples, various embodiments of the invention, with like reference numerals representing similar parts throughout the several views, and wherein.

DETAILED DESCRIPTION OF THE EMBODIMENTS

Figure 1:
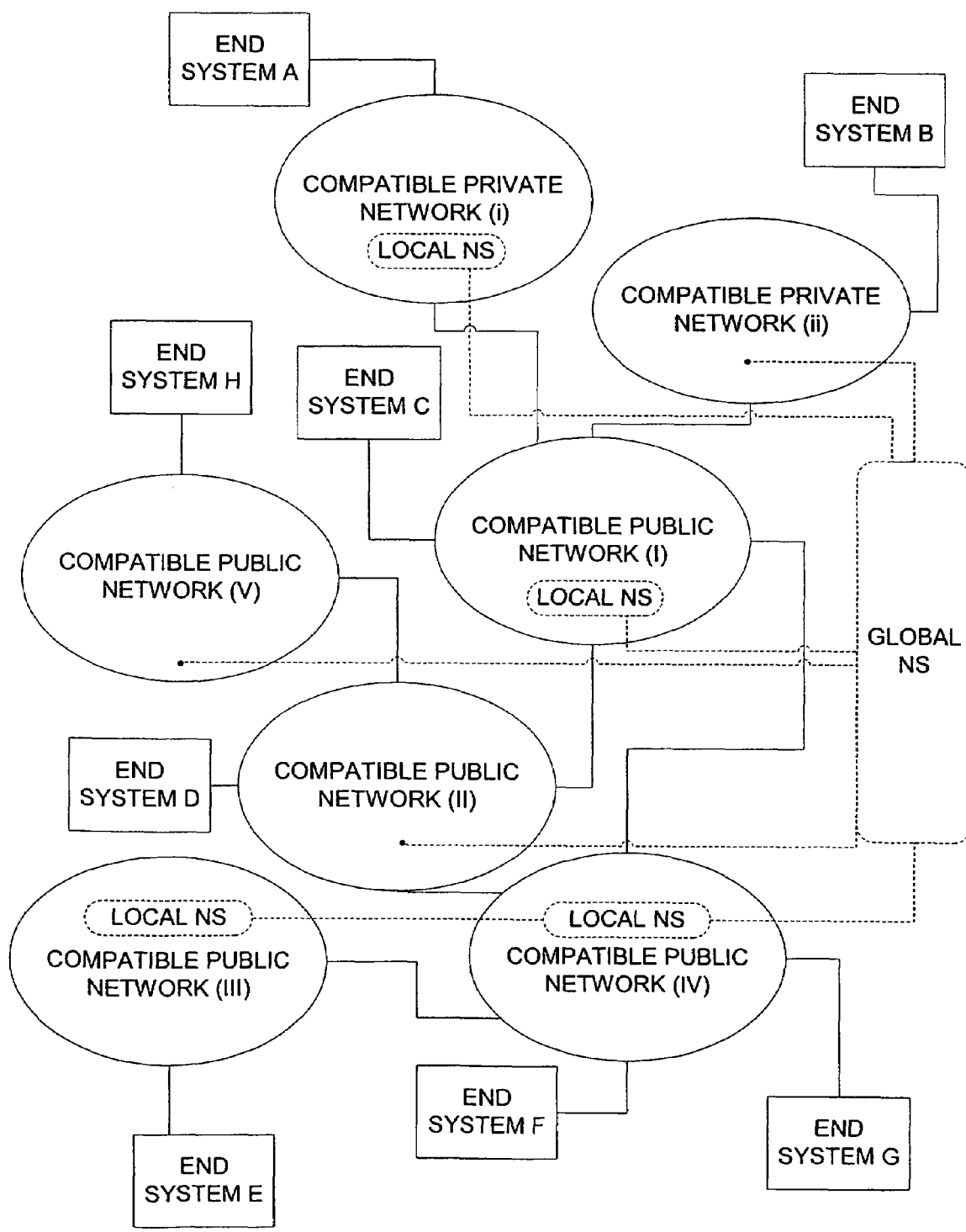
FIG. 1 shows a network topology in which the embodiments of the present invention operate.

FIG. 1 shows a network topology in which the present invention operates. The network is a global network including compatible public networks (CPN), compatible private networks, and end systems. In the context of the present specification, a network is a "compatible" network if it is compatible or compliant with a unifying standard. For example, an Asynchronous Transfer Mode (ATM) network is a compatible network when operating among other ATM networks.

Although using only one addressing scheme, some monolithic networks might be rendered compatible with addresses external to the network via Network Address Translation (NAT) or "tunneling" of addresses. Either private addresses under the same scheme or addresses under a non-supported addressing scheme could be translated or tunneled. In this context, a private address, although employing the same addressing scheme as the monolithic network, uses a range of addresses that would be otherwise assigned or reserved for the private network. The typical monolithic network under Internet Protocol (IP), for example, has provisions for NAT and tunneling that allow the Internet network to be the "carrier" network for network(s) employing non-routable addressing. That is, although the Internet network is "monolithic" by virtue of globally unique, single level addressing, the transport of signals having private or non-supported addresses does not change the monolithic nature of the Internet network because of the enforcement of NAT or tunneling when users connect to the Internet network.

It is common for a larger compatible public network to receive requests to transport private network traffic using different addressing schemes. For example, a large corporation might need to interconnect various sites which employ a non-supported private or legacy addressing scheme. An Internet Service Provider (ISP) might wish to offer Internet Access/Work-at-Home services using switched virtual circuits (SVC) of the compatible public network, but may prefer to use a number under the E.164 standard similar to existing narrow-band telephone services.

The invention as described herein employs ATM networks as an example network standard under which the present invention is optionally implemented. Accordingly, the invention is applicable to other types of networks as well (as only one example, applicable to Multiprotocol Label Switching (MPLS) and combinations of MPLS and ATM). However, the inventor notes that, in addition, the invention includes specific features and functionality that are particularly suited for ATM application, and where such are described, the particular advantages of the invention in the ATM context, separate from any generic network context, should be considered.

"Public" and "private" are terms of scale and access: a public network hosts and transports traffic from a variety of customers, and typically includes large capacity switches and network-network interfaces. Most telecommunications carriers can be considered public networks, and if operating under a unifying standard, are compatible public networks, depicted in FIG. 1 as Compatible Public Networks (I) through (V). Under ATM, compatible public networks may be denominated ATM Service Providers (ASPs).

Private networks take a variety of forms, can be considered a single network, and can be addressed as a single network, even if interconnected via one or more public networks (e.g., forming a virtual private network—VPN). The defining characteristic of a private network, for the purposes of this specification, is that the private network's primary function is not to transport public traffic, but rather to carry private traffic under the control of the private network owner (e.g., a large corporation with its own network). Private networks are compatible private networks, depicted in FIG. 1 as Compatible Private Networks (i) and (ii), when operating under the same unifying standard as compatible public networks.

End systems are those systems connected to the public network or private networks that originate or terminate traffic. End systems are typically telecommunications or data terminals, computers, and the like, and FIG. 1 depicts End Systems A-H, connected to private and public networks. Every end system has an address, and connections terminate at such end system addresses. At the same time, it must be noted that not every address belongs to an end system or terminates a connection. For example, network-network interfaces and user interfaces can be assigned addresses (e.g., under ATM, network-network interfaces such as PNNI and AINI, and "user" interfaces such as public and private UNI's).

In the context of the present invention, when ATM addressing is employed as the primary addressing scheme, such addressing optionally complies with ATM Forum Technical Committee documents AF-RA-106.000, "ATM Forum Addressing: Reference Guide", February, 1999, and AF-RA- 0105.000, "ATM Forum Addressing: User's Guide version 1.0", January 1999, the contents of which are expressly incorporated herein by reference in their entireties.

Global Bi-Level Addressing

Global bi-level addressing employs two addresses, a Wide Area Network (WAN) address and a destination user address, to establish a call over multiple compatible public networks. The Global bi-level scheme employs a WAN address that is globally unique and can be used for routing within each compatible public network. The destination user address can uniquely identify an end system within a destination private network connected to the public network at the WAN address.

FIG. 1, in addition to depicting network interconnections and internal substitution bi-level addressing, depicts a global naming system (Global NS, described below) for facilitating look-up of unique WAN addresses within the global network, and for addressing among various entities in the system, permitting "global" bi-level addressing. In the following description, with respect to FIG. 1, only Compatible Public Networks (II) and (V), and Compatible Private Network (ii), are limited to the use of the Global NS for the purpose of global bi-level addressing. In the context of the present specification, the term "route" will be used to mean the manner in which traffic is routed to a reachable address or address prefix. "Routing" can consist of a whole PNNI-like source route or can be as simple as knowing the next link to traverse to reach the desired prefix.

Global bi-level addressing may be considered a partially satisfactory solution to allow compatible public network owners (and sometimes private networks) to carry "alien" network traffic, necessarily using a global naming system for look-up, together with translation between destination user addresses and global WAN addresses. For example, global bi-level addressing permits a public network owner to offer Virtual Private Network (VPN) services to customer that need to interconnect different sites that are using destination user addresses that are different from the public network's routing addresses (globally unique WAN addresses).

A "terminating interface address", in the case of global bi-level addressing, is used for global inter-network routing, and is a public network owned global address within the public network's address space. This address, as defined in the global bi-level addressing system, must also be a globally unique WAN address. It should be noted that in the bi-level addressing look-up methods described herein, look-up of a terminating interface address is optionally done by a capable network device, such as an end system, a capable private network device, or a capable public network device. In general, these devices are at the edge of the network that must be traversed or are the traffic initiation devices. In the following description of global bi-level addressing, a "destination service address" uniquely identifies an end system within the destination compatible network. The "destination service address" is an address that is generally a compatible network address, but is generally owned by a private network or assigned by a public network, and therefore not "owned" by a public network.

As depicted in FIG. 1, when End System D, connected to Compatible Public Network (II), wishes to make a call or transmit information to End System H, connected to Compatible Public Network (V), End System H's destination service address—a globally unique WAN address—is used for look-up when a SETUP message enters the edge of Compatible Public Network (II) (i.e., a capable edge switch consults the Global NS). Although not shown in FIG. 1, each of End System D and H are within a private network. The Global NS returns a terminating interface address within Compatible Public Network (V)'s network, the terminating interface address also being globally unique. For routing within Compatible Public Networks (II) and (V), this terminating interface address is used since it is recognized by the switches of Compatible Public Networks (II) and (V). Upon reaching the terminating interface address, the terminating interface address is removed by the terminating interface (capable network device), and the SETUP message forwarded to End System H. Other than this scenario, a global bi-level addressing system can also be implemented by having a global WAN address, in combination with a User Address, to route traffic among destination public and private networks. This is different from those mechanisms used above where only the user address is presented in call setup message, and it requires global bi-level compatible public networks to use a global naming system for look-up, in combination with translation of the routing address.

If the User Addresses are not acquired as globally unique addresses, then the User Addresses form a portion of the global WAN address or terminating interface address. A global bi-level addressing domain could conceivably connect parties when the User Addresses (destination service addresses) in the domain are not globally unique, i.e., are solely private. If the User Addresses are private, they are carried in a sub-address field and are optionally tunneled through the compatible public network. In the context of inter-network routing, in some cases, a sub-address field is used by the private network and not by the compatible public network. If private addresses are carried in the sub-address field, the compatible public network should not make routing decisions based on the sub-address, and should deliver the sub-address information to the destination network as is.

The global WAN address or terminating interface address, as noted above, must be globally unique but the sub-address need not be globally unique. The global WAN addresses are acquired from a governing body to ensure uniqueness. Since global WAN addresses are globally unique, they can be used with the global (domain) naming system, as shown in FIG. 1, in a reverse look-up to find the "domain name(s)" associated with the user or terminating interface.

One method of implementing this type of global bi-level addressing is to join public networks in a mesh. However, with this solution, because compatible public networks now must mesh many networks and therefore rely on all the public networks to share public network to network interface (PNNI) routing information as a single monolithic network, each compatible public network is prone to failure due to configurational and operational errors among the compatible public network owners.

However, in such a scheme, all of the compatible public networks route using a single addressing scheme with globally unique addresses, relying on the "global" character of the address and the addressing scheme being used has to be recognized by all participating compatible public networks' PNNI routing. The global bi-level addressing method may not be suitable in all cases. In the case of standards for ATM inter-networking, the global bi-level addressing method might be insufficient. Standards for ATM networking are proposed by several organizations, among them the "ATM Forum". At the time of filing of parent U.S. Provisional Application 60/230,800, the ATM Forum was considering a global bi-level addressing scheme to allow an ATM Service Provider (ASP) to carry foreign and corporate traffic (e.g., private network traffic) using a globally unique WAN address. Applicant notes that this global bi-level specification has now been approved, along with a system at least partially corresponding to internal substitution bi-level addressing as discussed herein. The ATM Forum global bi-level addressing allows ASPs to offer Virtual Private Network (VPN) services as noted above, but also poses limitations as noted above, since all participating ASPs must route using a single addressing scheme and a globally addressed network—possibly using a joined ATM Public Network-Network Interface (PNNI) mesh. The current specification for PNNI is set forth in ATM Forum Technical Committee Document AF-CS-0115.000, "PNNI Transported Address Stack version 1.0", May, 1999, the contents of which is expressly incorporated herein by reference in its entirety. This solution suffers from the problems noted above because ASPs need to mesh many PNNI-based networks into a single monolithic network, and each ASP's network is therefore prone to failure configurational/operational errors by other ASPs.

Internal Substitution Bi-Level Addressing

The present invention relates to an internal substitution bi-level addressing system that permits compatible public networks to handle service addresses, including external globally unique WAN addresses, through a homogeneously addressed compatible public network using a substituted "internal" address.

Internal substitution bi-level addressing (at least characterized by "substitution" of a foreign address, i.e., translation into and out of an internal address space) is optionally employed as an alternative to, or in combination with, global bi-level addressing. In combination with global bi-level addressing, or, alone, internal substitution bi-level addressing permits a compatible public network to route based on an internal "pseudo-address" space, while global WAN addresses (addresses that are used by users as service addresses) are translated when entering the compatible public network. With internal substitution bi-level addressing, the particular addressing scheme of entering global WAN addresses does not matter because the global WAN addresses are not used to route within the compatible public network. Consequently, internal bi-level addressing is capable of routing to vastly different global WAN addresses (which might differ depending on a service's addressing scheme, e.g., ICD, E.164). The complete addressing semantics and syntax of the global WAN addressing scheme are handed over from end to end. Unlike the global bi-level addressing mentioned above, the global WAN addresses are not interpreted when entering the internal substitution bi-level addressing compatible public network.

When combining internal substitution bi-level addressing with global bi-level addressing, there are three different address ownership domains: the User Address, the WAN address, and the internal substitution address. Without global bi-level addressing, there are two different address ownership domains: the translatable address, and the internal substitution address.

In combination with global bi-level addressing, the User Address or destination service address is privately assigned as globally unique, or is acquired from a service provider as globally unique (i.e., within the overall system of connected compatible public networks). The WAN address or terminating interface address, as previously noted, must also be globally unique to be used in the global bi-level addressing system. The internal substitution address is used only for routing within a compatible public network that facilitates the internal substitution bi-level addressing scheme, and is owned by such a compatible public network. There is no necessity for the internal substitution address to be globally unique, and the internal substitution address can therefore be within a non-public (and/or non-globally unique) address block. Notwithstanding the lack of any requirement for the internal substitution address to be globally unique, the internal substitution address can be globally unique without affecting the functionality of the internal substitution bi-level addressing system.

Absent association with a global bi-level addressing regime, the translatable address must be one, of any format, that is registered in a local naming system (defined below) or, that is capable of being looked up when the local naming system has not registered the address, as noted below. The internal substitution address has the same requirements as noted above.

In internal substitution bi-level addressing, global WAN Addresses can also be used by compatible public networks to bind to their internal routing addresses (e.g., to ports signifying user-network interfaces) or to find an identifying code designating a recognizable compatible public network. In general, in the present specification, the use of the term "code" or "identification code" refers to the identifying code assigned (possibly by a governing standards body) to a compatible public network. In this case, a first compatible public network is able to route user addresses that are either assigned within the first compatible public network or that are assigned by a second compatible public network. Each address requires network address translation in order to obtain an internal routing address for routing.

Referring again to FIG. 1, when End System E, connected to Compatible Public Network (III), wishes to make a call or transmit information to End System G, connected to Compatible Public Network (IV), End System G's destination service address—which might or might not be a globally unique WAN address—is used for look-up when a SETUP message enters the edge of Compatible Public Network (III), i.e., a capable edge switch consults the local naming system (NS). The local NS returns an Internal Routing Address as a terminating interface address within Compatible Public Network (III)'s network. In this case, the terminating interface address need only be meaningful to that network, not necessarily globally recognizable. For routing within Compatible Public Network (III), this Internal Routing Address is used since it is recognized by the switches of Compatible Public Network (III). Upon reaching the Internal Routing Address, the Internal Routing Address is removed by the egress capable network device, and the SETUP message forwarded to Compatible Public Network (IV)'s ingress edge switch.

Other scenarios are also possible under the internal substitution bi-level addressing system. For example, Compatible Private Network (i), having its own local naming system, optionally employs internal substitution bi-level addressing in the same manner as noted above to route traffic across the private network from or to Compatible Public Network (I) and/or End System A.

With reference to FIG. 1, Compatible Public Network (IV) can route traffic directed to any End System that is registered with the global NS under internal substitution bi-level addressing, since the local NS is connected to the global NS and can query the same. For example, traffic from Compatible Public Network (IV) can be routed to End System C if End System C is registered to the global NS with the identifying code for Compatible Public Network (I), since Compatible Public Network (IV) will route to its egress port connecting to Compatible Public Network (I) on look-up of the identifying code with the global NS.

Compatible Public Network (IV) can route traffic directed from End System G to End System E under internal substitution bi-level addressing, even if End System E were not registered with the global NS, since the local NS of Compatible Public Network (IV), by agreement, can receive sufficient information from the ("connected") local NS of Compatible Public Network (III) to assign its egress port connecting to Compatible Public Network (III) as the Internal Routing Address (which will be recognized by Compatible Public Network IV) for End System E's service address.

This behavior does not stress the internal substitution compatible public network's public network-network interface routing tables because WAN addresses (both alien and native) are not used by the internal substitution compatible public network for routing. Rather, the internal substitution compatible public network employs the highly aggregated internal substitution address for routing. The propagation of public network-network interface routing tables and routing becomes significantly simpler because the number of foreign address exceptions is reduced. Network address look-up and translation at the compatible public network edge might increase, but such address look-up and translation need only be performed once at call setup, and the flexibility provided by the system provides a worthwhile benefit for any increase in such look-up and translation.

Global and Internal Addressing Schemes

Addresses that are global WAN addresses can be of any form that maintains global uniqueness within the global domain. ICD, DCC, E.164 and similar addressing schemes can be used as the WAN address as long as this condition is satisfied. If the global domain naming system for global bi-level addressing is integrated with the Internet Domain Naming System (DNS), a unified naming system can allow IP related information to become available for integrated public network applications and vice versa, both global and internal substitution bi-level addressing systems being able to take advantage of this capability.

With respect to the internal substitution address, choosing the addressing scheme for internal routing within a public network is an engineering and administrative decision that must be undertaken by each compatible public network depending on its own circumstances. When internal bi-level addressing is used, compatible public networks are free to choose any addressing scheme (as noted above, some examples being ICD, DCC, or E.164) whether the addresses are public or private. When a compatible public network employs internal substitution bi-level addressing, it is also possible to employ private addresses because these addresses never leave the compatible public network's domain to the larger world.

Although the combination of internal substitution bi-level addressing and Global bi-level addressing includes three separately identifiable "ownership" domains, from the viewpoint of the compatible public network employing internal substitution bi-level addressing, there are only two address domains. The first is the compatible public network's internal substitution addressing domain and the other is the substituted service addresses, which are usually, although not necessarily, public and globally unique WAN addresses. The User Address is considered part of the WAN address (but can be normalized to meet this requirement).

Transported Address Stack

Figure 9:
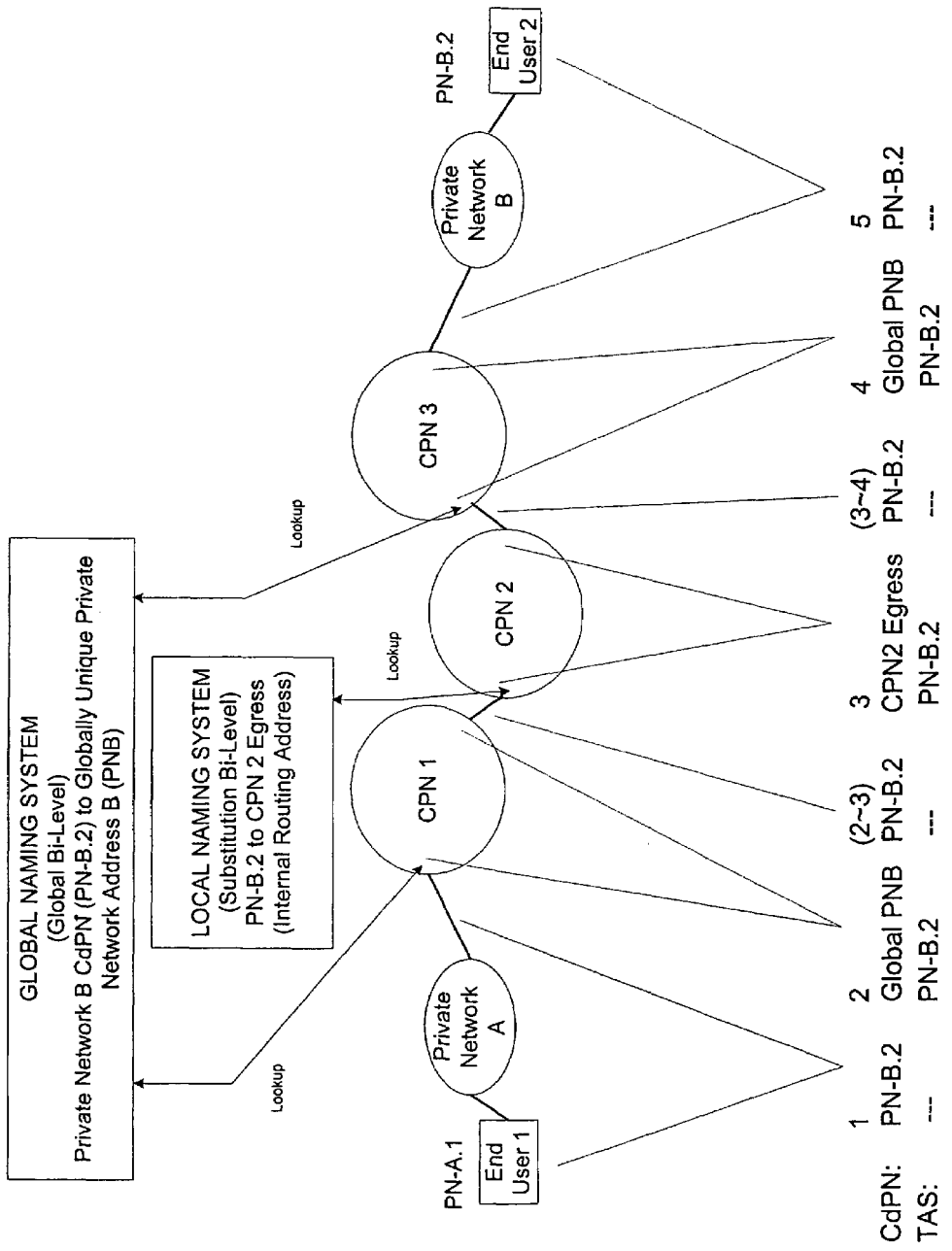
FIG. 9 shows a first variation of address transport across a combination of internally addressed compatible networks and compatible networks lacking internal addressing capability.
Figure 10:
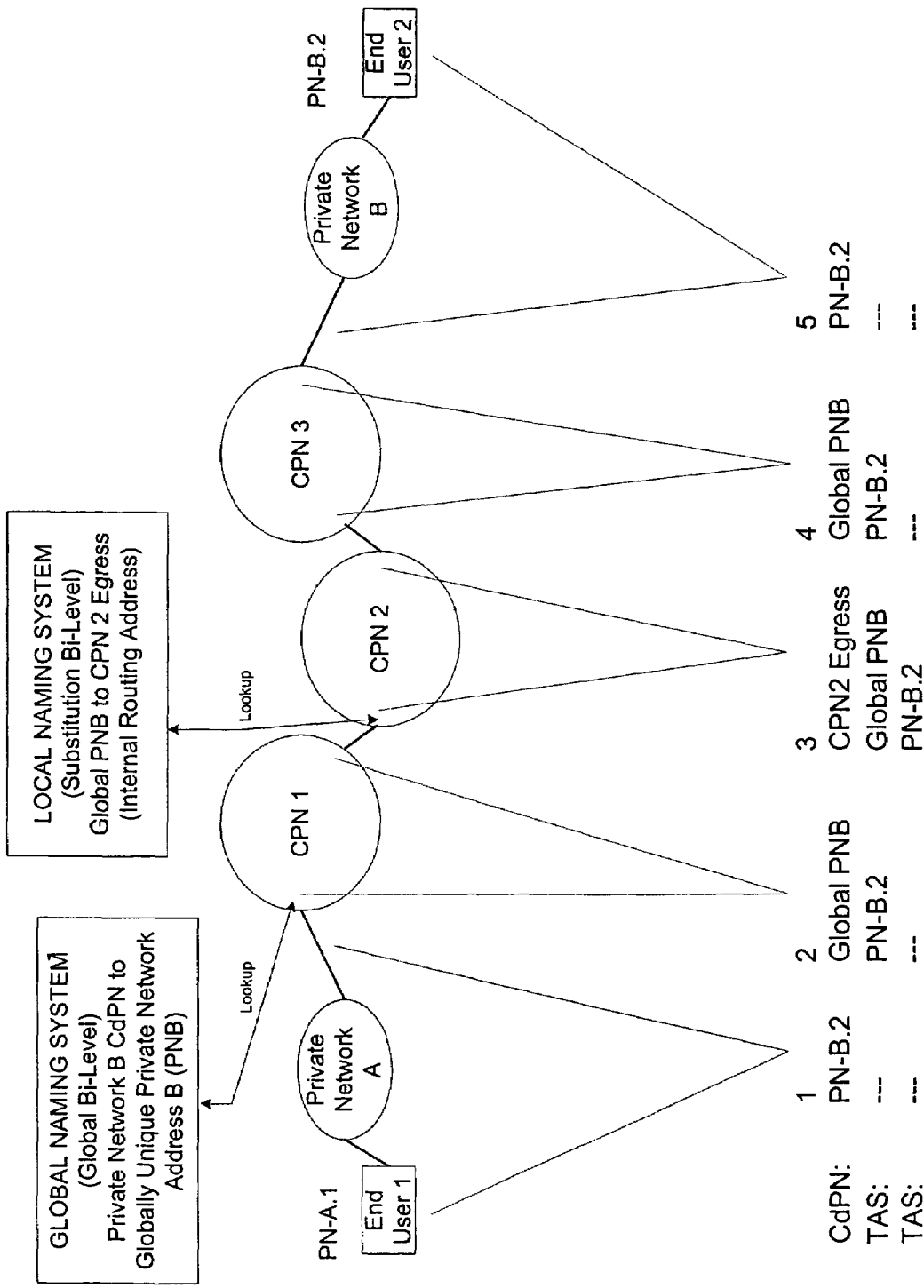
FIG. 10 shows a second variation of address transport across a combination of internally addressed compatible networks and compatible networks lacking internal addressing capability.

Compatible public networks can employ a public network-network interface (PNNI) and user-network interface (UNI) that include provisions for transport address stack information elements that allow transparent carriage of addresses through the public network-network interface network. FIGS. 9 and 10 show two types of behavior of a transported address stack when used in the compatible public network implementing internal substitution bi-level addressing, and are described below in the discussion of internal substitution bi-level address handling.

A transported address stack is generally implemented as a set of information elements in a push on, pop off stack. The top transported address information element is popped at a designated point in the network. In one variation, shown in FIG. 10, multiple transported address information elements can be pushed onto the transported address stack, and at a transport termination point, one or more transported address information elements are popped from the transported address stack. It should be noted that the ATM Forum Technical Committee Document "PNNI Transported Address Stack version 1.0", AF-CS-0115.000, May 1999, sets forth a specification for a transported address stack that is optionally consistent with the invention described herein.

In a compatible public network employing together such a public network-network interface (with the transport address stack) and internal substitution bi-level addressing, the receiver's (called party's) WAN address is stored in the transport address stack information element by the compatible public network's ingress switch and an internal substitution address (exit user-network interface port) is assigned and used as the receiver's address. The internal substitution address can optionally be from the address block that was assigned to the egress/ingress switch, and if so, can be easily aggregated from the point of view of the public network-network interface. When a signaling message reaches the compatible public network's exit switch (user-network interface port), the internal substitution address in the current setup message IE will be discarded and the old WAN address in the transport address stack information element replaces the discarded internal substitution address. The transported address stack IE on the top of the stack will then be removed.

The receiver's or called party's (often WAN) address in the signaling message is used by the compatible public network at the ingress switch to locate the called-party's current network egress user-network interface port as an Internal Routing Address, or to locate a network identifying code that can indirectly determine the Internal Routing Address (as noted above, one manner of such location is look-up through a local naming system and global naming system). If the called party is not directly connected to the current compatible public network, the mapping between the network identifying code and Internal Routing Addresses is used to decide the internal routing address that leads to the exit tunnel to the destination compatible public network. At the ingress switch (possible performed by capable network devices), the old called-party (usually global WAN) address is placed into a new information element in the transported address stack and the exit port (user-network interface as an Internal Routing Address) is used for routing.

Figure 2:
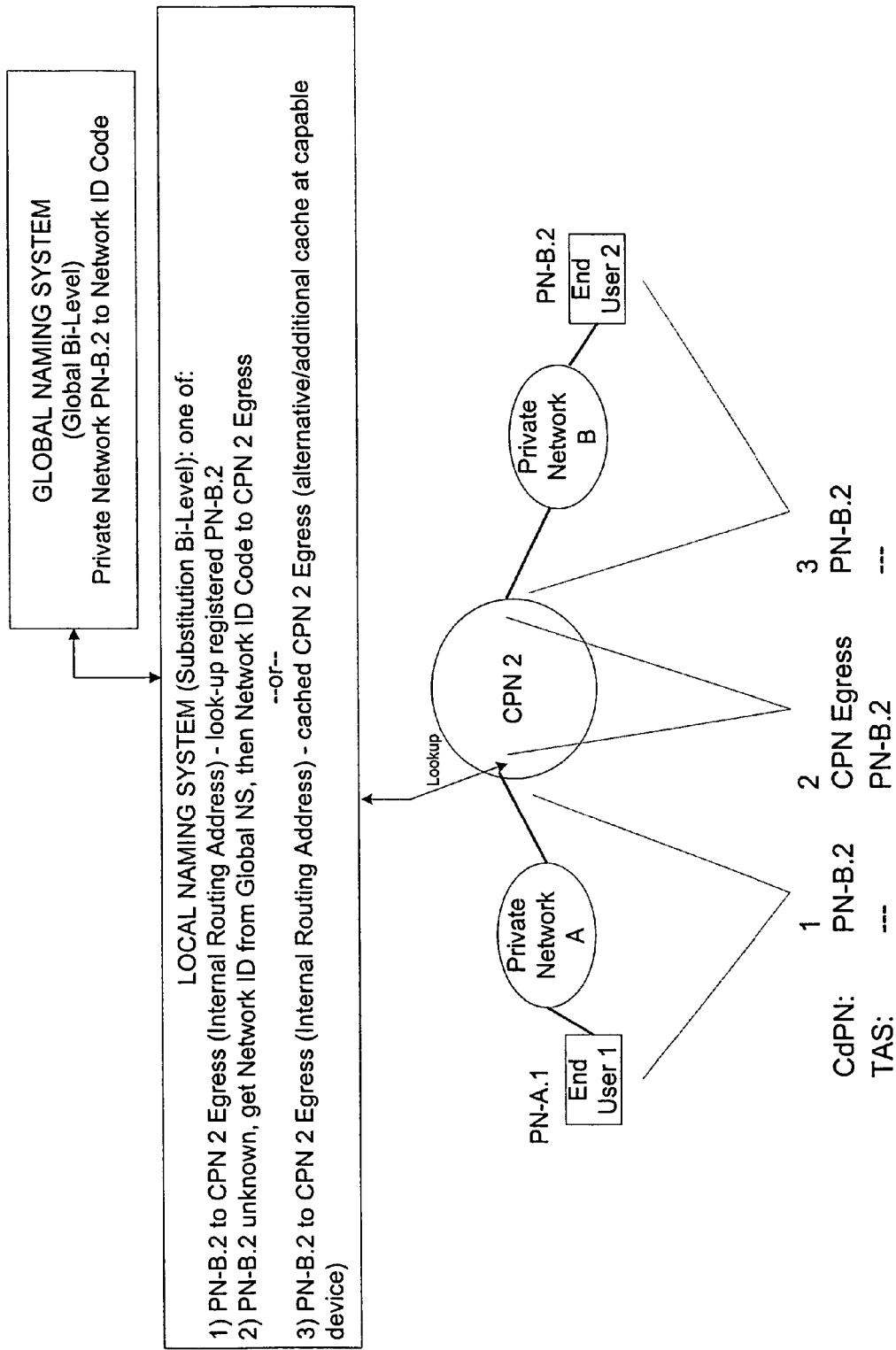
FIG. 2 shows address transport across an internally addressed compatible network.

FIG. 2 shows address transport an internally addressed compatible network. The border switch at the Private Network A side of Compatible Public Network 2 has an interface to Private Network A, an interface to the local naming system server (Local Naming System), and an interface to Compatible Public Network 2 routing mesh for routing and carrying traffic (optionally, although not shown, the border switch may have an interface for connection to the global naming system server, either substantially direct or via the local naming system server). The border switch at the Private Network B side of Compatible Public Network 2 has an interface to Private Network B, and an interface to Compatible Public Network 2 itself for routing and carrying traffic. This border switch may optionally have interfaces to the local naming system and/or global naming system (for acting as an ingress switch in the other direction).

In FIG. 2, End User 1 wishes to call End User 2. End User 2 has a local address within Private Network B, which has a registered (note the description of registration below) address in Compatible Public Network 2, which employs internal substitution bi-level addressing. As the SETUP message enters Compatible Public Network 2, Compatible Public Network 2 consults the local naming system (in which the received address can be cached or registered), which can consult the global naming system (if the received address is not cached or registered), and provides the Internal Routing Address (CPN2 Egress) for egress from its network.

In this case, a new TAS IE will be created, the Service Address will be stored in the TAS, and (if determinable) a local CPN2 Egress address (Internal Routing Address) has been placed in the CdPN. Compatible Private Network 2 therefore does not have to be able to route on End User 2's service address (whether a Global WAN address or not), only on its own internal addressing scheme.

At the CPN2 egress capable network device, the Internal Routing Address (CPN2 Egress) is discarded, and the service address PN-B.2 is retrieved from the TAS. The SETUP arrives at Private Network B with the PN-B.2 address (the original service address) as the called party address.

Once entering the controlled network of the compatible public network, the exit port internal substitution (routing) address is used to route the signaling message within the compatible public network domain. As shown in FIGS. 2, 9 and 10, the internal substitution (routing) addresses never leave the compatible public network domain, so the internal substitution network generally requires the use of only one level of stack in the transported address stack. This implementation does not require the TAS to be empty. When the signals arrive at the ingress port of the compatible public network, this implementation will add one level to the stack during the intra-CPN (compatible public networks) routing, but will restore the stack when the signal exits the compatible public network. If the signaling traffic is transferred into the next compatible public network's domain, the process can be repeated. In most cases, a one level address stack (information element) is sufficient.

The present description contemplates that internal substitution bi-level addressing can be used to enhance the addressing/routing capability of an existing compatible public network and, optionally, as the default, primary, or only addressing system of an existing compatible public network.

Under single-level addressing, some addresses can be considered "internal" in that they are both of a type (e.g., addressing scheme or protocol) recognized by the subject network and within the known routable address space of that "compatible" type (having known destinations). Other addresses are "alien" for various reasons, including addresses of a type (addressing scheme or protocol) not recognized by the subject network, or not within the known routable address space of a recognized (compatible) type.

In the case of single level addressing, a compatible public network cannot route signals having such "alien" addresses. In the case of global bi-level addressing, a compatible public network may be able to route more signals than a single level addressed network, including those addresses would be resolvable by consulting a global naming system. However, the global bi-level addressing system cannot easily route unknown types (addressing schemes) of addresses.

In the case of internal substitution bi-level addressing, a compatible public network can conceivably route signals having "alien" addresses of any type or address space, as long as routing for those addresses can be resolved by the use of the local naming system or global naming system. No addresses are truly "internal" or "alien" as described above with reference to single level addressing or global bi-level addressing. Advantageously, for internal substitution bi-level addressing, the routing address space is wholly divorced from the service address space. In this manner, no service addresses, whether locally or remotely owned, are used for routing. As a result of the independence of the service and routing address spaces, peering is easier, routing tables become smaller, and portability of service addresses is facilitated. No service addresses are treated as exceptions—all are treated with the same look-up and internal bi-level address substitution and routing.

For internal substitution bi-level addressing, when an address space is used for internal routing addresses, the same space can be used for service addresses. This does not preclude the internal routing address from being the same as the service address, because the same address could be carried in the TAS (as a service address to be restored) and in the CdPN (for routing purposes only) during routing. Any service address will have look-up and network address translation performed for the purpose of routing (such network address translation including both substitution of the original destination service address with an internal routing address before routing to destination, and replacement of the internal routing address with the original destination service address after routing to destination). It is noted that, to facilitate this system, the set of capable network devices can be expanded beyond the set of switches bordering another compatible public network to the set of all edge switches (excluding wholly internal switches).

Naming System

To handle address-to-address and address-to-code look-up, the internal substitution bi-level addressing system uses an internal look-up directory system or database. For internal substitution bi-level addressing, any database responsive to capable network devices is generally suitable—a proprietary database, an LDAP or DAP system, or the like. LDAP (Lightweight Directory Access Protocol) is a "lightweight" version of DAP (Directory Access Protocol) proposed by the Internet Engineering Task Force (IETF), both DAP and LDAP enabling directory services that would be suitable for the look-up database. However, higher levels of interoperability with any global database and with Internet domain naming increasingly require conformity, and the description herein anticipates such interoperability. Accordingly, when such interoperability is to be enabled, a "naming system" conforming to standards for the Domain Naming System of the Internet is generally suitable. In order to reflect all levels of interoperability of the look-up database, the term "naming system" is used throughout this specification. However, in the context of the present specification, "naming system" generically describes a look-up directory system or database for internal substitution bi-level addressing and/or global bi-level addressing, and should not be limited to a database having features necessary for interoperability (e.g., "names"), except as explicitly so limited herein. Specifically, for address-to-address look-up, any of a database, directory, or naming system are suitable.

The local "naming system" as described herein for internal substitution bi-level addressing can work in concert with a global naming system, but is optionally independent. If compatible with a global naming system, the local naming system optionally uses a separate local naming system subtree that can be concatenated with the global naming system tree. As noted, since internal substitution addresses are not used outside of the internally addressed compatible network, external devices or nodes can be denied access to this local naming system, except as noted herein.

A naming system stores and retrieves mappings between names and certain defined objects, and in the present generic case, can store and retrieve mappings between addresses. In the case of internal bi-level addressing, look-ups are among destination service addresses, terminating interface addresses (routing address), and (optionally) identifying codes for compatible public networks, but as noted, can also extend to domain names. Each of the identifying codes, destination service address, and domain names is a "destination address identifier", and each of the service address and domain names is a "destination service address". In the case of global and/or Internet interoperability, "domain names" are mapped to public network addresses and vice versa.

The global naming system and the internal compatible naming system, if compatible with Internet domain naming, optionally comply with Domain Name System standards, such as RFC 1034, 1035, 1995, 1996, 2065, 2136, and 2137 (these standards are available at Internet Engineering Task Force: http://www.ietf.cnri.reston.va.us/). One such naming system is the ATM Forum's ATM Naming System (ANS). In a global naming system, global WAN addresses can also be used by the global network of diverse compatible public networks to find a static/dynamic binding to the identifying code. The static binding can be used to find out information such as the chain of ownership. The dynamic binding can be used to find out information such as which compatible public network identifying code a user (e.g., end system, data terminal, or telecommunication terminal) is currently connected with (e.g., for "nomadic" use).

The naming system is optionally implemented via a defined resource record (in the ATM system, optionally the ATM Address Resource Record) for mapping addresses to other addresses, for mapping addresses to identifying codes, and/or for mapping "domain names" to global addresses. Address look-up is optionally similar to implementations of IP address look-up. The resource record can optionally, but not necessarily, provide at least a field for defining different formats of addresses, and a field for the address itself. Subaddress information can be included or excluded; such inclusion can depend on whether the subaddress information is to be used for routing or not.

Naming System: Domain Names

When "domain names" are employed in the naming system, they can be generated from a globally unique public network address, i.e., under rules that concatenate designated substrings of the public network address into a resolvable name. The rules are generally different for different address schemes, and a "domain name" optionally falls within a different top level domain depending on the address scheme from which the domain name is generated. Although a "naming system" can be used for address look-ups, in the internal substitution bi-level addressing system, "names" are not usually used as a key for searching. Nonetheless, when the naming systems for bi-level addressing are to be fully compatible with the Internet DNS system, both names and addresses can optionally be recognized by a capable network device.

For global bi-level addressing, as noted above, at least two addresses are normally used: a global WAN address to select the interface from a routing network to a destination network, and a User Address to select the end system in the destination network.

Associated with the destination network domain, global bi-level addressing records one or a set of global WAN addresses associated with each user address. The mapping of global WAN addresses for a particular user address is one or a set of addresses of routing network interfaces through which the destination address of the user is directly accessible. When a resource record is requested for a user address, the result is the global WAN address(es) associated with the user address(es).

Internal substitution bi-level addressing records one or a set of internal routing addresses associated with each alien address (including global WAN addresses) and, if implemented and necessary, with the compatible public network's identifying code. The set of internal routing addresses for a particular alien address or identifying code is the set of network interfaces to which the call addressed using the alien address or identifying code is to be directed.

As noted, for internal bi-level addressing, the alien address or external Service Address is, in most cases, globally unique. Such uniqueness allows naming system address-to-address (Service Address to Routing Address and vice versa) look-ups to avoid ambiguity from the searching indices.

Capable Network Device

Figure 3:
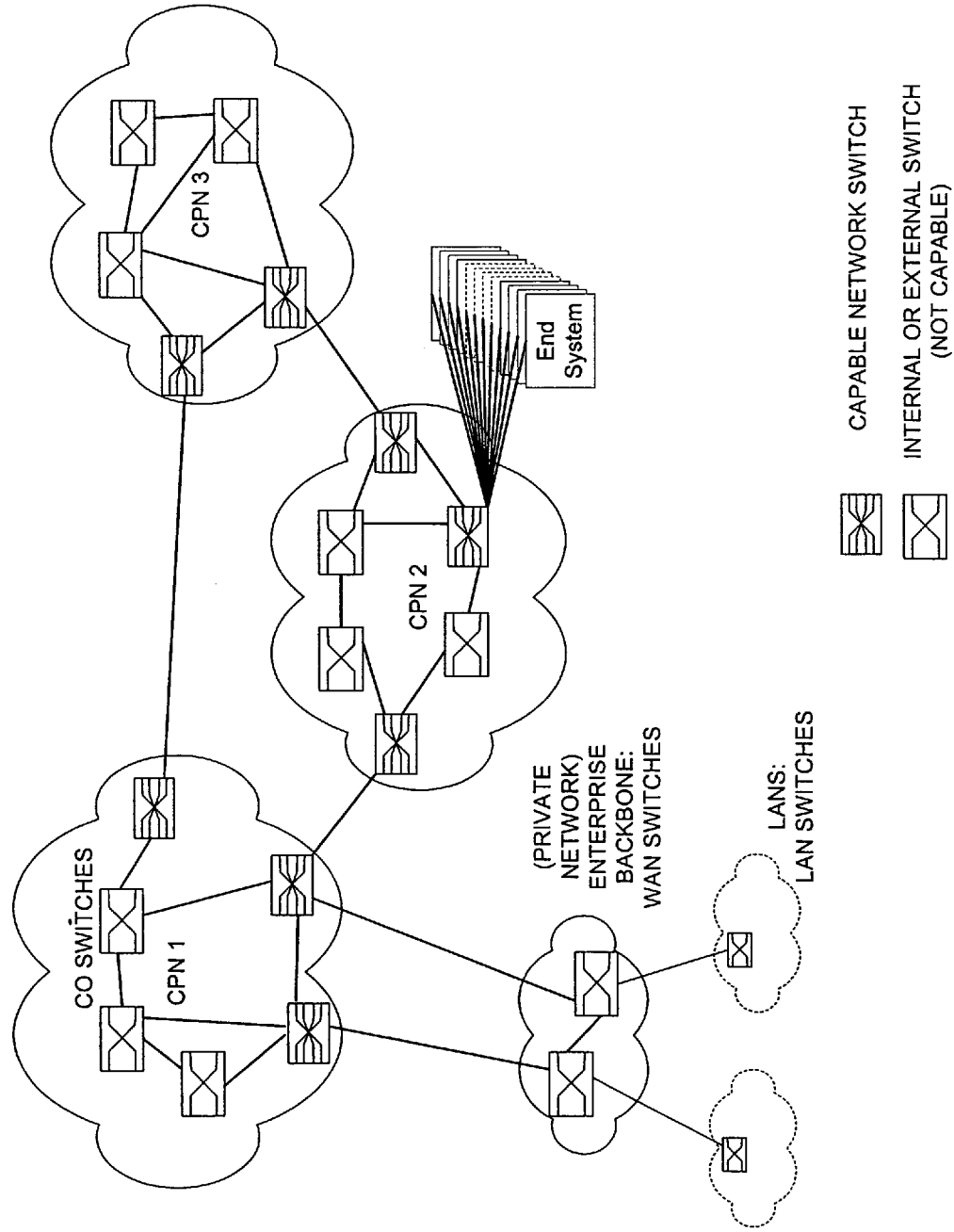
FIG. 3 shows a detailed network topology including capable switches.

Look-up from a naming system, and formation and stacking of transport address stacks, are performed by "capable network devices" at ingress points (each ingress point may also be an egress point as discussed below). FIG. 3 shows a detailed network topology including capable network devices (e.g., switches). As shown in FIG. 3, ingress points (and egress points) are defined as those border switches directly connected to border switches controlled by another network owner (or switches directly connected with user devices). The capable network device includes (or is) a border switch that, in the case of internal substitution bi-level addressing, is defined to be capable of carrying out the necessary ingress/egress functions of internal substitution bi-level addressing, which can include communicating with the local naming system, and based on the naming system query results, forming/stacking transport address stacks (or alternative means of transporting service addresses while providing an internal routing address, at least as described herein). Any network switch, whether large-capacity inter-networking switches (e.g., Central Office or "CO" switches as depicted in FIG. 3) or smaller-capacity network-to-interface switches (e.g., WAN or LAN switches in FIG. 3), can act as a capable network device if it includes these capabilities and limitations. In some cases, an end system can also act as a capable network device.

It should be noted that the capable network device in the case of internal substitution bi-level addressing communicates with the local naming system, which then handles further communications with the global naming system or Internet DNS, but the capable network device can also include the capability of communicating with a global naming system or Internet DNS, which then (optionally) handle further communication.

The capable network device at the egress point (e.g., those capable network devices at the edges of the network clouds in FIG. 3), in the case of internal substitution bi-level addressing, is defined by the capability to carry out the necessary egress functions of internal substitution bi-level addressing, which can include discarding the called party number, promoting any addresses from stacked information elements as appropriate (in the case of a multi-level TAS), and forwarding the re-addressed messages to connected switches and/or interfaces. Any network switch, whether large-capacity internetworking switches or smaller-capacity network-to-interface switches, can act as a capable network device if it includes enough of these capabilities and limitations.

A particular network switch can act as a capable network device in both ingress and egress roles, and usually will assume both roles (each capable network switch depicted in FIG. 3 is such a capable network device).

Procedures

The following contains a procedural description of internal substitution bi-level addressing as discussed above, and also shows how this infrastructure can be used in local connection and in multiple compatible public network connection scenarios. In this description, the term "internally addressed network" refers to a compatible public network or private network employing the described internal substitution bi-level addressing. "Service Address", "External Address", and "destination service address" are in some cases used interchangeably, and represent a network address (usually, but not necessarily a compatible public network address) that is used by a customer for identifying the end system (e.g., also data terminal or telecommunications terminal) owned. For global data communications, the Service Address is usually a globally unique WAN address, and the overall system can be set up to require such uniqueness. The terms "Routing Address", "Internal Routing Address", and "terminating interface address" are also used interchangeably in some cases, and represent addresses under the internally addressed public network's addressing scheme chosen by a compatible public network operator for routing purposes, and specifically for internal substitution bi-level addressing. Usually, the Internal Routing Address is tightly integrated with the public network switching infrastructure and is part of the switch routing table.

Notwithstanding that the description herein is generally of a compatible public network, the "internally addressed" network can be either a compatible public network or a compatible private network. Any service address received by an internally addressed network in the setup message information element (IE) called party number field (CdPN) is considered an "external" Service Address. This Service Address is in most cases, although not necessarily all cases, globally unique, and can be a customer owned address, an address assigned by the compatible public network, or an address assigned by another compatible public network. The look-up procedures defined herein are usually implemented on ingress nodes of the internally addressed network.

Internal substitution bi-level addressing accomplishes an increased level of functionality by differentiating addresses into two distinct domains—internal addresses for routing (Internal Routing Address) and "external" addresses for service (Service Addresses—generally global WAN addresses). "External", in this context, generally means "other than for internal routing purposes". The two addressing domains are tied together through network address translation (NAT). The two address domains (Routing and Service) serve different purposes and usually would not be used interchangeably beyond the NAT transition or handling point. All addresses received by the internally addressed network are considered external Service Addresses to the internally addressed network, and would use internal substitution bi-level operation to traverse the Internally Addressed network (although addresses recognizable as global bi-level addresses may also be routed by internal substitution bi-level addressing).

Accordingly, any Service Address space can be reused if translated into the Routing Address domain for internal routing. Address mapping can be from any addressing scheme (e.g., E.164/ICD/DCC and the like) to any other addressing scheme (e.g., E.164/ICD/DCC and the like), or even to a subset of the same address space. Because of this differentiation between Service Addresses and Routing Addresses, Service Addresses are portable, and can be moved anywhere. Furthermore, a single internal routing or internal substitution addressing scheme can serve multiple services using different and/or foreign addressing.

The three major functions required by the internal bi-level addressing are address registration, address look-up, and bi-level address handling (or NAT).

Address Registration

Before any Service Addresses can be used by any compatible network, the Service Address must be registered. A registered Service Address can be bound to internal routing address(es) for routing and transport purposes by the local naming system look-up.

The registration includes a dynamic naming system update process that binds an external service address to the compatible public network's Internal Routing Address. In addition, the external Service Address can be additionally bound to the identifying code of the compatible public network receiving the connection. The naming system includes a definition of the network identifying code. After the registration process, a user Service Address can be bound to a local compatible public network's Internal Routing Address or to a network identifying code. Registration additionally provides the network identifying code so that external queries are able to determine which Service Addresses are currently serviceable by each compatible public network.

From the perspective of the local naming system, a Service Address can either belong to the local compatible public network, or can belong to another party. Either Service Addresses that belong to the local network or those that belong to another party are considered "external", i.e., for other than routing purposes. If the Service Address is local, the local naming system is the source of authority (SOA) to manage the records. Where the Service Address belongs to another party (a connected global WAN address owner or private network), the local compatible public network is not the SOA for managing the records. A local compatible public network can use a Service Address belonging to another party in the local naming system look-up, but is not able to change information without remote naming system authorization.

The naming system server includes the capability of addressing mapping, especially Service Addresses to Internal Routing Addresses. The Internal Routing Addresses are populated to the naming system server in blocks when the naming system server is set up. These internal routing addresses can be, and usually are, highly aggregated and usually do not change until the internal addressing arrangement with respect to switches changes.

Accordingly, for registration, the service addresses can be associated in two ways (i.e., with internal routing addresses and with network identifying codes) when the called number corresponding thereto is external and globally unique. Additionally, a set of internal routing addresses for connection to various other compatible public networks can be set up, and private arrangements between compatible public networks can identify the service address, providing additional ways of identifying the service address.

A network identifying code for each compatible network to which calls can be routed is registered with one or more corresponding Internal Routing Addresses representing the egress ports to such networks, depending on global network topology and the routing capabilities of intervening compatible networks.

Figure 4:
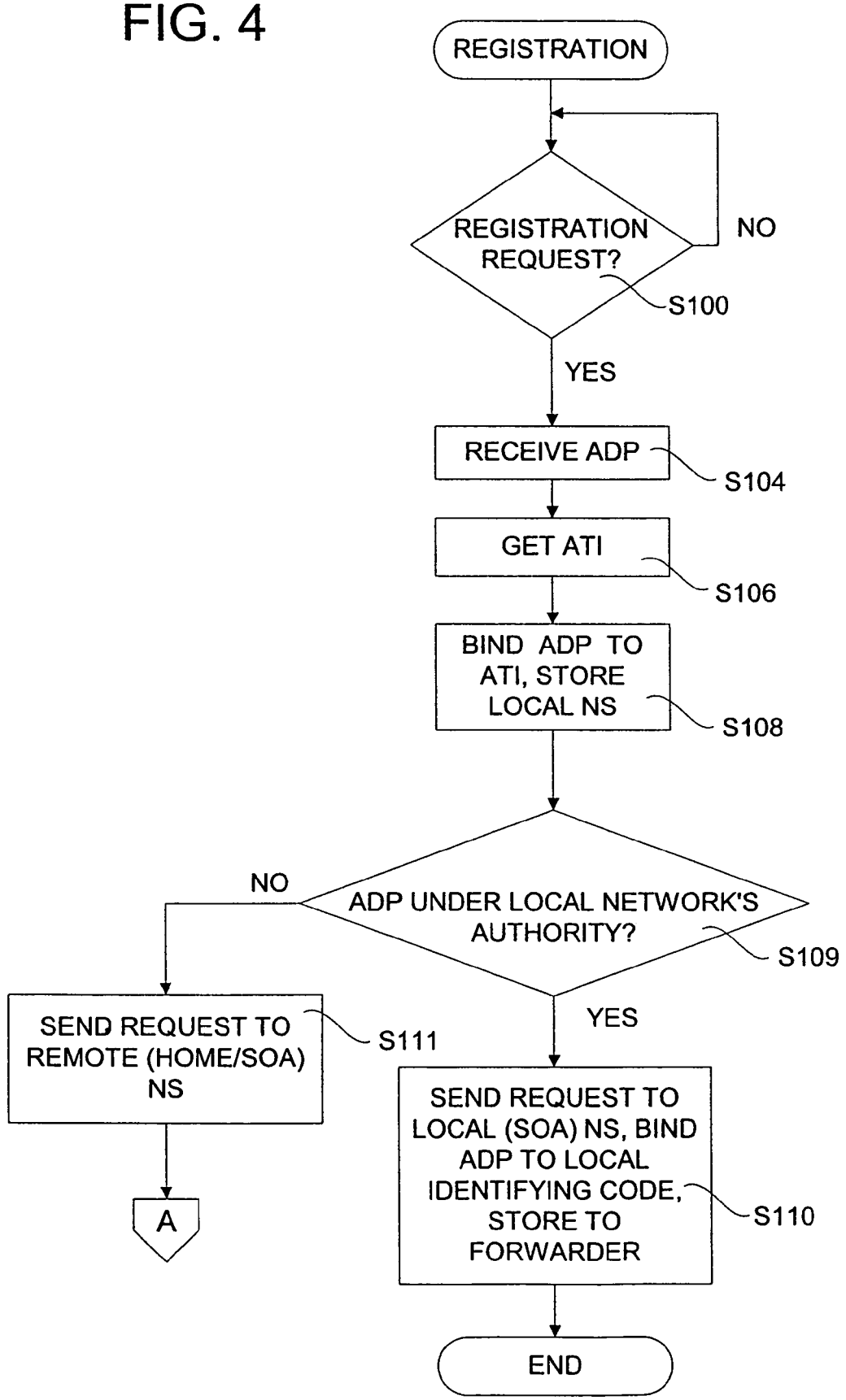
FIG. 4 shows a process flow for registration of address pairs in a database or naming system.

FIG. 4 shows a process flow for registration of address pairs in a database or naming system. In FIG. 4, terminology appropriate for ATM networks is employed: Service Addresses as ATM Destination Point addresses (ADP) and Internal Routing Addresses as ATM Terminating Interface addresses (ATI). Nonetheless, the procedures would be essentially identical for other compatible public networks. Initially, in step S100, the naming system server is rendered responsive to messages for updating (adding to) the naming system tables for the internal substitution bi-level addressing compatible network.

The registration system receives the Service Address (ADP) from a device at step S104, and depending on internal network topology, gets an (aggregated) Internal Routing Address (ATI) corresponding to the ATM switch port (step S106).

In step S108, the ADP is bound to the ATI, and stored in a local naming system server. As noted below, at least one server in the local naming system can be configured as a "forwarder" server, that is responsible for external requests from other compatible networks or devices regarding bindings between ADP and the network identifying code(s) ("destination compatible network identifying code"). If the ADP is under the local network's authority (step S109:YES), then the local network identifying code is bound (step S110). The local network identifying code bound in step S110 is the identifying code of the local compatible public network, and can be used by the forwarder to respond to outside queries or update a global NS when the compatible public network is connected to a global NS. Accordingly, if the called number or Service Address is directly connected to the compatible public network, then the Internal Routing Address and Service Address are registered (step S110) in the local naming system when the end system or interface requests registration or is the subject of a registration request. As previously noted, the Service Address will have been assigned by the compatible public network or is owned by the user. Accordingly, the local naming system obtains the mapping from the called number (Service Address or destination service address) to the Internal Routing Address or terminating interface, representing an appropriate ingress or egress interface port, as well as a mapping to the identifying code of the compatible public network.

At step S109, if the ADP (Service Address) is not under the local network's authority, the registration request may be a remote registration attempt (e.g., for service portability reasons, step S111). It should be noted that not every "NO" result at step S109 necessarily results from a remote registration attempt, but that step S111 is illustrated herein for those cases where remote self-registration on the home (remote) network is required to be carried out. In step S111, a request can be sent from the local network to the remote "home" network, which is the source of authority (SOA) for the "moving" portable service address. The request can optionally be handled by the remote "home" network in the manner set forth below in steps S202 through S206 of FIG. 5 (as indicated by the branch "A" to FIG. 5).

By agreement, other compatible public or private networks, even if not connected to the global naming system, can share (possibly limited) information in their own local naming systems in order to populate the local naming system for Service Addresses registered in the other compatible networks. The local naming system is responsible for updating such "partner" networks, e.g., via a gateway or direct connection to the partner naming system.

The "forwarder" of the local naming system is responsible for updating the global NS as well when such update is necessary and scheduled.

In some cases, if the called number or Service Address to be registered is not related to the local compatible public network, and the Service Address corresponds to a globally unique WAN address registered in the global NS, then the Service Address can be queried against the global naming system. The global naming system can reply to this global WAN address with an identifying code that uniquely identifies a compatible public network. When no ATI may be resolved, since network identifying codes are also bound to Internal Routing Addresses, a look-up on the global Service Address will first return the identifying code bound to that Service Address, and then the Internal Routing Address will be resolved from the returned identifying code. Such steps could intervene between steps S104 and S108.

Figure 5:
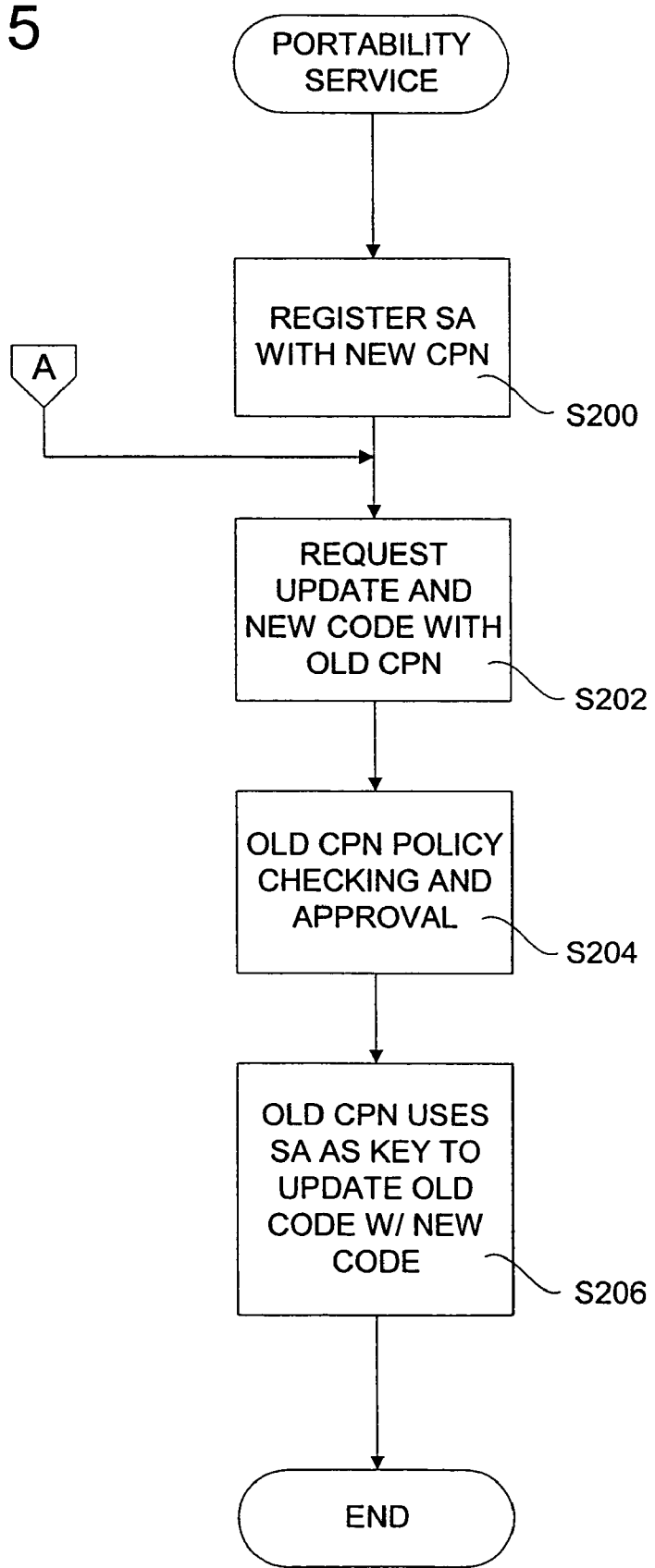
FIG. 5 shows a process flow for portability service.

Service portability is enabled by the registration and look-up system. A user can keep an acquired Service Address no matter where the user travels. FIG. 5 shows a process flow for use of a service address moving from one compatible network provider to another. When a user travels from his service provider's compatible public network to another independent public network, the user registers the existing Service Address (SA) with the destination compatible public network (step S200, using the registration process shown in FIG. 4). The user must also request/inform the user's home compatible public network's naming system of the move and the intended destination (i.e., register the Service Address and identifying code of the destination network to the home network's naming system, possibly through dynamic updates—step S202). The home compatible public network performs appropriate policy checking (step S204) to determine if the connection request should be granted, and if so, uses the Service Address to index and to overwrite the old identifying code (the old or home network's code) to the destination compatible public network's identifying code (step S206). Once the remapping is done, any calls to that Service Address are redirected to the new compatible public network's identifying code, and thereby to the new compatible public network.

Alternatively, if the end system comes to "visit" a new network, the capable network device on the visited network can determine the ingress port (and Internal Routing Address) that the request is coming from, and register the same as the Internal Routing Address bound with the end system's original Service Address. This is an explicit "sign-on/register" process which may be compared to wireless cellular phone roaming. The "home" network's naming system server will also receives a "sign-off" from the Service Address owner (after a successful "sign-on" to the visited network). The "sign-off" can be initiated by the Service Address user or can be initiated by a network device in the visited network (as a delegate or agent on behalf of the Service Address owner). If the home network is connected to the global naming system, the change is available to every compatible public network that is also connected to the global naming system. This change is also available to every naming system server within the home network.

Address Look-Up

Address look-up in internal substitution bi-level addressing is accomplished via the infrastructure of the local naming system. It should also be noted that internal (non-border) switches are not expected to have access to the local naming system, nor do they require such capabilities. Only capable network devices at the network edge require such access (although it is possible that not all edge switches require access to the local naming system). As noted above, the local naming system infrastructure is capable of handling address-to-address mapping, and optionally address-to-identifying-code mapping. The naming system infrastructure can interconnect with a global naming system, allowing customers from one compatible public network to make calls to customers connected to another compatible public network. In a system not connected to a global naming system, if the look-up yields no Internal Routing Addresses, the call should be ended.

As noted above, the local naming system can handle address-to-address look-ups (for Service Address to Internal Routing Address) and can handle address-to-identifying-code look-ups. Address-to-identifying-code mapping might be needed to reach another compatible public network because the Internal Routing Address bears no significance outside the internal compatible public network. Additionally, the local naming system can optionally cache address-to-identifying-code mapping to save traffic. Address-to-Address (Service Address to Routing Address and vice versa) look-up is transparent to the user making the call or connection, since such a look-up is performed by the capable network devices.

Three primary results occur from address look-up. If the Service Address is registered to the local naming system of the compatible public network, one or more mapped internal terminating port addresses are returned to the look-up as Internal Routing Addresses (identifying the terminating interface), from the table that is populated (by dynamic updates) during the address registration process. The local naming system (or even the capable network device), if more than one terminating interface is available, will select one terminating interface under a predetermined algorithm (e.g., based on a relevant criteria, or a hierarchy). If the Service Address is not registered to the local naming system of the compatible public network, but an outside compatible public network's identifying code is "cached" by the local naming system—the "cached" identifying code is returned to the look-up. If the Service Address is not registered to the local compatible public network and there is no cache information leading to that Service Address, i.e., if the Service Address cannot be resolved by the local naming system to a local internal routing address, then the look-up query can be sent directly or forwarded via the local naming system ("forwarding" being inclusive of both) to the global naming system if such a connection exists and if the Service Address is a globally unique WAN address. In this case, the Service Address is resolved to the compatible public network identification code associated with the compatible public network.

Figure 6:
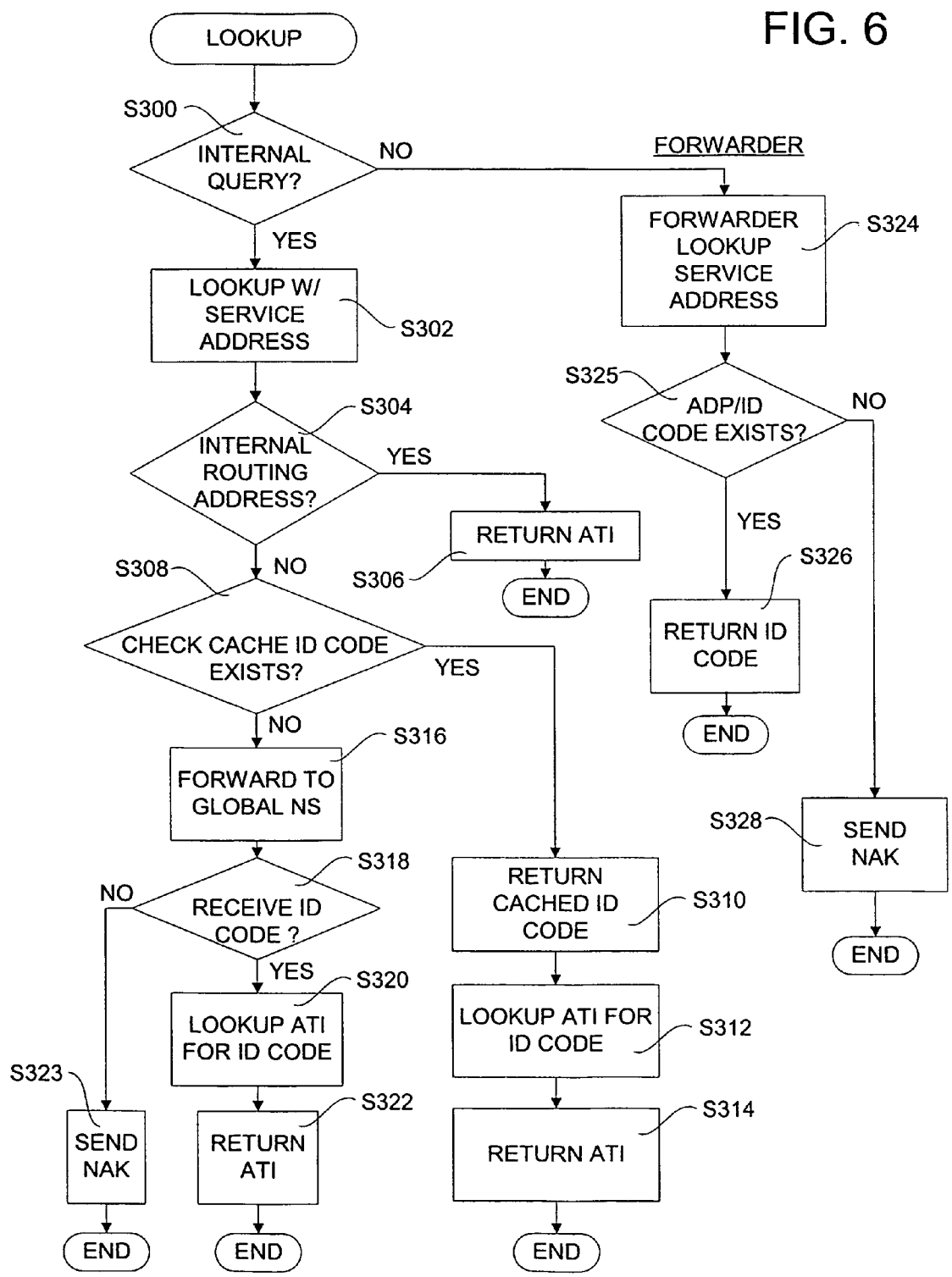
FIG. 6 shows a process flow for naming system address look-up.

FIG. 6 shows a process flow for look-up of internal network ports within an internal address space. The local naming system is responsive to queries from capable network devices (and/or, optionally, additionally to network-external entities) in the manner depicted therein, although not necessarily in the order of the steps set forth or including every step in FIG. 6. The naming system can include one or more servers, but at least one server in the system is optionally a "forwarder" that handles primarily Service Address (ADP) to identifying code mappings (although "forwarder" functionality can optionally be included in some other or all other naming system servers). Remaining naming system servers primarily handle ADP (Service Address) to ATI (Internal Routing Address) mappings, and any naming system server lacking "forwarder" capability can optionally consult a "forwarder" when no ATI mapping is found. Part of the functions of FIG. 6 are carried out by a "forwarder" server of the local naming system, and can optionally be considered separate processes if necessary, especially handling of external queries.

If the query to the local naming system server is local, i.e., comes from a capable network node of the local compatible public network (step S300: YES), the naming system proceeds to look up the received Service Address in the naming system tables (step S302). An address, a code, or a null result can be returned by the look-up. If the returned information is an Internal Routing Address, then the Internal Routing Address (ATI) is returned in response to the query (steps S304-306). This process provides Internal Routing Addresses (ATI) for any Service Addresses that have been registered with the local naming system, whether a Service Address registered by direct connection to the local compatible public network, a Service Address registered by naming system information shared between "partner" networks, or a global WAN address that has been directly registered or registered via the global naming system.

If the returned address is not an Internal Routing Address (step S304: NO) and if a naming system server (and/or "forwarder") determines, via cached codes, that the returned information is an identifying code and exists in the database (step S308: YES), the code is returned to the query (step S310). Additionally, since in most cases an Internal Routing Address will be required for routing, the naming system server (or forwarder) can proceed to cross-reference the code with an Internal Routing Address (ATI)(step S312) and return this Internal Routing Address (ATI) to the query in addition to or instead of the code (step S314). It should be noted that although FIG. 6 shows that the local naming system "automatically" proceeds to cross-reference the code to an Internal Routing Address, this behavior can alternatively be delegated to the capable network device, which will contact the naming system server and receive an Internal Routing Address corresponding to the code received.

If the returned information is a not a code or identifying value, i.e., is a null value (NO at step S308), the query is forwarded to the global naming system (step S316). The global naming system can return an identifying code or a null value. If the Service Address is registered therein, the global NS returns at least the identifying code (step S318-YES). The code can then be used by the local naming system (or, as noted below, the capable network device) to look up the appropriate Internal Routing Address (ATI)(step S320), which is then returned in response to the query (step S322). Alternatively, if the system is so arranged, at step S318, the "failed" look-up status can be returned to a capable network device that can query the global naming system, in which case the capable network device carries out subsequent processing in steps S316, 318, and 323. If nothing is returned from the global NS (step S318-NO) then a NAK signal is returned by the local naming system (step S323). That is, if no Internal Routing Address can be established by any of the procedures, the call is failed.

It should also be noted that the same technique for forwarding of the query t6 the global naming system upon the failure of the local naming system could also be used to forward the query to a partner's local naming system in limited and agreed upon circumstances.

If the query does not come from a capable network device within the local compatible public network (NO at step S300), the query is deemed to be from an external party seeking to identify whether or not a Service Address is recognized by the local naming system (and thereby served by the local compatible public network), and is handled by the "forwarder". The Service Address is checked in the "forwarder" of the local naming system (step S324), and if an ADP and/or identifying code is registered in the local naming system for that Service Address, the "forwarder" of the naming system acknowledges that the Service Address can be handled by the local compatible public network by returning the code (steps S325 and S326). The "forwarder" primarily handles the mapping between the Service Address (ADP) and the identifying code, while the remaining naming system servers primarily handle the ADP-ATI mapping (in general, the "forwarder" handles communications with the global NS, although there may be exceptions). Otherwise, the "forwarder" of the naming system indicates that the Service Address is not serviced (NAK—step S328).

Bi-Level Address Handling (NAT)

Figure 7:
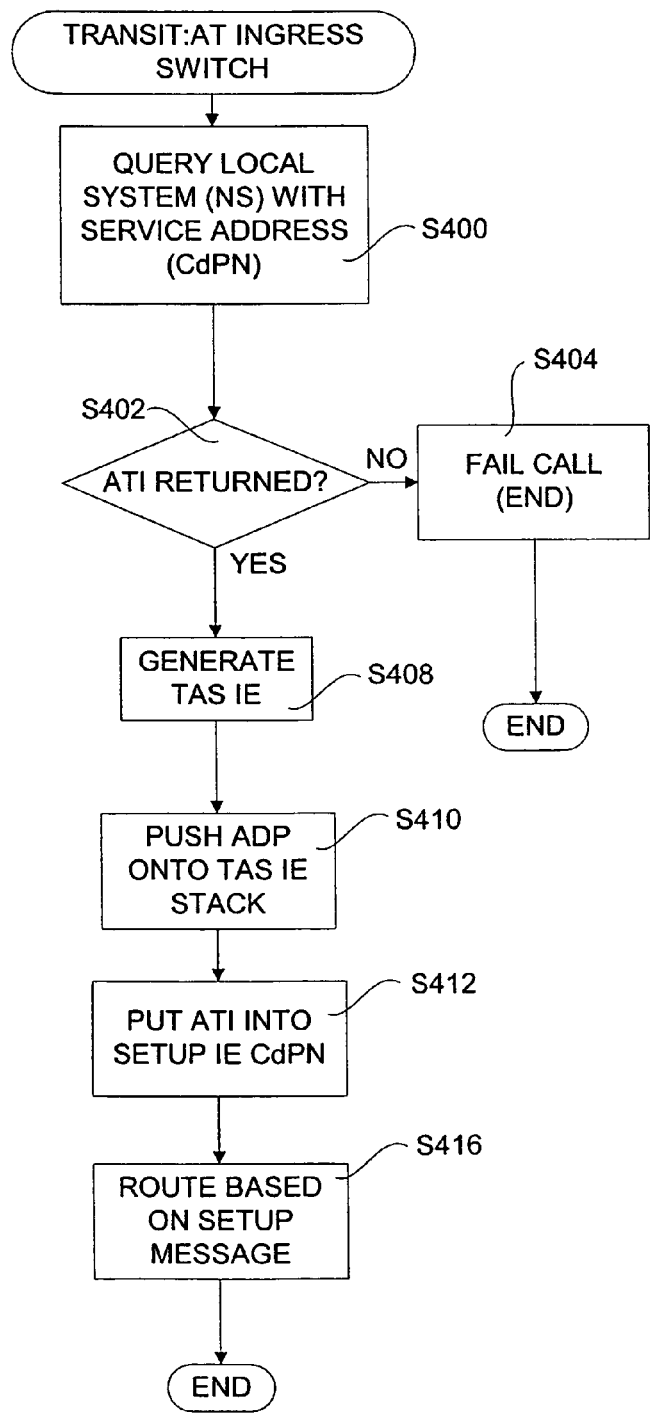
FIG. 7 shows a process flow for operations at a capable network ingress switch.
Figure 8:
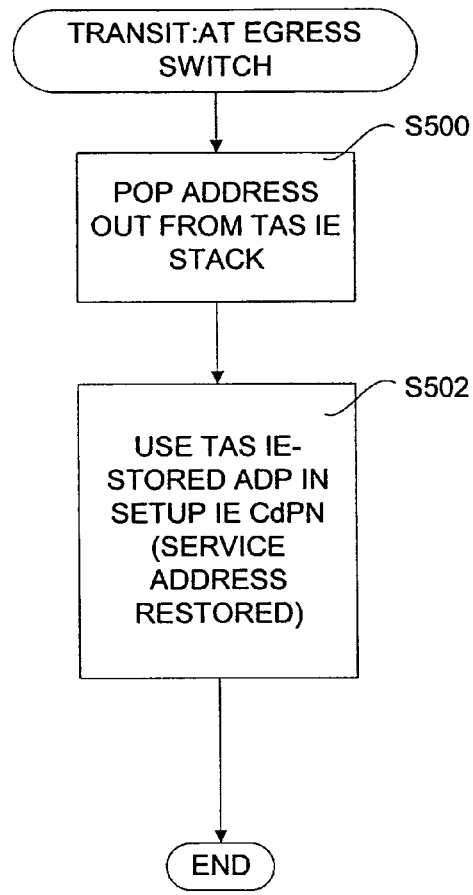
FIG. 8 shows a process flow for operations at a capable network egress switch.

Bi-level address handling or Network Address Translation (NAT) takes place at the edge of the compatible public network, one translation (or "substitution") at ingress point and one translation (or "substitution") at the egress point. At the ingress points, one or more capable network devices will be assigned to look-up and perform NAT for inbound calls coming to certain user network interfaces (e.g., UNI ports). There can be several capable network devices attached to an ingress and/or egress switch, depending on network design, and on issues such as performance, load balancing, and/or administrative issues. FIGS. 7 and 8 show an exemplary process for bi-level address handling, at the ingress and egress nodes respectively. FIG. 7 shows a process flow for traverse of a call setup and connection, at an ingress to an internal network, across the internal network using an internal address space, while FIG. 8 shows a process flow for traverse of a call setup and connection, at an egress to an internal network, across the internal network using an internal address space. As noted above, bi-level address handling begins when an Internal Routing Address is returned by the local naming system in response to a query including the Service Address (step S400, including the processing shown in FIG. 6). At this stage, the Service Address can be the address in the called party number section (CdPN) of any received call setup message.

As noted above, if no Internal Routing Address (ATI) is returned by any of the look-up procedures employed by the local naming system or capable network device (step S402— NO), then the call is failed (step S404). Otherwise, the transport address stack (TAS) information element (IE) is created (step S408) by a capable network device and is inserted into a SETUP message for carrying the original called party number address information across the compatible public network. If a TAS IE already exists, depending on the system employed, any additional TAS IEs can be pushed onto the stack (as shown in FIG. 10).

A capable network node can optionally create a new TAS IE (step S408), and place the old ADP (Service Address) into the called party number section of the new transport address stack information element (step S410). The selected Internal Routing Address (here, ATI) is placed in the CdPN field of the SETUP IE (step S412). It should be noted that the ingress capable network node must handle all retries. Promotion of the Service Address from the Transported Address Stack IE to the Called Party Number field (CdPN) is usually done at the terminating internal interface at the edge of the internally addressed network (see FIG. 8 and the corresponding description below). As noted above, the capable network device uses the Internal Routing Address (the result of the naming system query) to determine the appropriate internal egress port. If so enabled, the capable network device can also route on the (cached) identification code, for example, using an extra database (or naming system) look-up to determine the appropriate network border (edge) switch address as the egress port. In the preceding description of the look-up process, the extra naming system look-up is integrated into the primary look-up, but the extra look-up can alternatively be handled in a subsequent independent process by the capable network device.

In either case, an internal egress port address as an Internal Routing Address will be placed in the SETUP information element, e.g., while the ADP is placed in the transport address stack information element (as noted, step S410). Also as noted, routing in the compatible public network is performed (S416) based on the modified called party number address (now substituted with an Internal Routing Address in the form of a highly aggregated internal egress port address).

As shown in FIG. 8, at the egress point (an internally addressed network egress border node), a capable network device receives an outbound SETUP message, consults the TAS IE to determine the Service Address to be restored (S50), and replaces the called party section of the SETUP information element with the original Service Address that was saved in the transport address stack information element by the ingress point device (step S502). For example, in a push-pop transport address stack, the TAS IE is popped, the internal routing address is cleared from the setup IE and discarded, the original Service Address moving to the SETUP IE. The SETUP message and subsequent carried call therefore passes to the connected compatible public network with the original Service Address and calling party number information restored (in the case of FIG. 9), having traversed the internally addressed network of the compatible public network employing internal substitution bi-level addressing.

In the case of the system shown in FIG. 10, the transported address stack is carrying nested addresses, and transported address stack information element(s) can be retained. In such a case, in step S502 of FIG. 8, the TAS IE stored address would not necessarily be the original service address, but would be the last (nested) address pushed onto a multi-level TAS.

In this manner, there are at least two ways in which the invention contemplates address transport across a combination of internally addressed compatible networks and compatible networks lacking internal addressing capability. In one way of carrying out address transport across a combination of internally addressed compatible networks and compatible networks lacking internal addressing capability (shown in FIG. 9), only one address is pushed onto the stack at a time (the "current" routing address being held in the CdPN field). In a second way of address transport across a combination of internally addressed compatible networks and compatible networks lacking internal addressing capability (shown in FIG. 10), multiple addresses are pushed onto the TAS.

It should be noted that "cached" as discussed herein means cached in at least either the local naming system server, forwarder, or a (network border) switch, even when only one is described in detail.

FIG. 9 shows address transport across a combination of internally addressed compatible networks and compatible networks lacking internal addressing capability, in which only one level of the TAS is used. The interfaces of the border switches of FIG. 9 are substantially as described with reference to FIG. 2.

It should be noted that, in FIG. 9, either the egress border switches of networks employing global bi-level addressing (such as Compatible Public Networks 1 and 3), or the ingress border switches of networks employing internal substitution bi-level addressing (such as Compatible Public Network 2), are capable of removing the globally unique WAN address from the CdPN and placing the original service address (from the TAS) into the CdPN. This can take place in a number of ways, e.g., the egress border switch of a network employing global bi-level addressing (such as Compatible Public Network 1), or a predetermined set of ports therein, can be dedicated to connections to a network known to employ internal substitution bi-level addressing (such as Compatible Public Network 2), and such a switch could therefore be controlled to restore the service address (PN-B.2) to the CdPN field. Alternatively, the ingress border switch of a network employing internal substitution bi-level addressing (such as Compatible Public Network 2), or a predetermined set of ports therein, can be dedicated to connections to a network known to employ global bi-level addressing (such as Compatible Public Network 1), and such a switch could therefore be controlled to restore the service address (PN-B.2) to the CdPN field. Further, the ingress border switch of a network employing internal substitution bi-level addressing (such as Compatible Public Network 2) could be configured to restore any service address in a received TAS (should one be received) before carrying out internal substitution bi-level addressing, without regard as to the capabilities of the sending network. These types of capability are shown in FIG. 9 by the notations at "(2~3)" and "(3~4)".

In FIG. 9, End User 1 wishes to call End User 2. End User 2 has a local address within Private Network B, which has a globally determinable address. Compatible Public Network 1 and Compatible Public Network 3 employ global bi-level addressing, and Compatible Public Network 2 employs internal substitution bi-level addressing. As the SETUP message enters Compatible Public Network 1, the address within Private Network B (PN-B.2) is checked against the global naming system, and a globally unique WAN address (Global PNB) is placed in the CdPN field and the PN-B.2 address is pushed onto the TAS. Capable network devices within Compatible Public Network 1 must be able to route on addresses in the globally unique WAN address space, and the devices determine that the SETUP should be routed via Compatible Public Network 2.

Compatible Public Network 2 either consults the local naming system (if the PN-B.2 service address is cached or registered), which can consult the global naming system (if the PN-B.2 service address is not cached or registered), and provides the Internal Routing Address (CPN2 Egress) for egress from its network, removing the PN-B.2 service address and placing the CPN2 Egress address into the CdPN.

In this case, only the original private address remains in the TAS. The Service Address is kept in the TAS for transit across the internally addressed compatible public network, and a local CPN2 Egress address is placed in the CdPN. Compatible Private Network 2 therefore does not have to be able to route on the Global PNB address or PN-B.2 service address, only on its internal addressing scheme.

At the CPN2 egress capable network device, the internal address (CPN2 Egress) is discarded, and the service address PN-B.2 is retrieved from the TAS. The SETUP is handed over to Compatible Public Network 3 in the same form as originally entering Compatible Public Network 2 (i.e., with the service address in the CdPN field), Compatible Public Network 3 performs essentially the same operations as Compatible Public Network 1 performed, i.e., retrieving the (same) Global PNB from the global naming system. Compatible Public Network 3 is able to route on the Global PNB address, and does so. Routing tables in both Compatible Public Network 1 and 3 must include the Global PNB address, but Compatible Public Network 2 needs only its internal aggregated routing tables. The SETUP arrives at Private Network B with the PN-B.2 service address, the Global PNB address having been discarded by the Compatible Public Network 3 egress network device.

When the TAS is only one level (i.e., not nested as in FIG. 9), it is advantageous in that it can be considered more robust than the nested TAS system (as shown in FIG. 10) in some cases, i.e., if an intervening network is not able to handle a nested TAS, then the system will nevertheless carry routable signals. There is less risk that an intervening network will not be able to route on a nested address, because all intervening networks perform their own look-up (which may not be necessary if the PN-B.2 service address is cached).

FIG. 10 shows address transport across a combination of internally addressed compatible networks and compatible networks lacking internal addressing capability, in which the TAS includes nested addresses. The interfaces of the border switches of FIG. 10 are substantially as described with reference to FIG. 2.

It should be noted that, in FIG. 10, the upstream (i.e., non-final destination) networks employing global bi-level addressing (such as Compatible Public Network 1), or employing internal substitution bi-level addressing (such as Compatible Public Network 2), do not need to remove the globally unique WAN address from the CdPN and place the original service address (from the TAS) into the CdPN in the manner of FIG. 9. In FIG. 10, the globally unique WAN address can be transported in the TAS along with the original service address by internal substitution bi-level addressed networks, and the globally unique WAN address can be restored to the CdPN or retained in the CdPN upon entering each network employing global bi-level addressing. In comparison to FIG. 9, this type of capability is shown in FIG. 10 by the lack of the notations at "(2~3)" and "(3~4)" in FIG. 9.

In FIG. 10, End User 1 wishes to call End User 2. End User 2 has a local address within Private Network B, which has a globally determinable address. Compatible Public Network 1 and Compatible Public Network 3 employ global bi-level addressing, and Compatible Public Network 2 employs internal substitution bi-level addressing. As the SETUP message enters Compatible Public Network 1, the address within Private Network B (PN-B.2) is checked against the global naming system, and a globally unique WAN address (Global PNB) is placed in the CdPN field and the PN-B.2 address is pushed onto the TAS. Capable network devices within Compatible Public Network 1 must be able to route on addresses in the globally unique WAN address space, and the devices determine that the SETUP should be routed via Compatible Public Network 2. Compatible Public Network 2 either consults the local naming system (if the Global PNB address is cached or registered), and can consult the global naming system (if the Global PNB address is not cached or registered), and provides the Internal Routing Address (CPN2 Egress) for egress from its network, pushing the Global PNB address onto the TAS.

In this case, the original private address is demoted, along with the Global PNB address, as the Service Address. Compatible Private Network 2 therefore does not have to be able to route on the Global PNB address, only on its internal addressing scheme. The SETUP is handed over to Compatible Public Network 3 in the same form it was received, and since Compatible Public Network 3 is able to route on the Global PNB address, it does so. Routing tables in both Compatible Public Network 1 and 3 must include the Global PNB address, but Compatible Public Network 2 needs only its internal aggregated routing tables. The SETUP arrives at Private Network B with the PN-B.2 address, the Global PNB address having been popped by the Compatible Public Network 3 egress capable network device.

When the TAS has nested addresses (as in FIG. 10), it is advantageous in that it requires fewer look-ups than the single level case (where the Global PNB is not retained in the TAS, as in FIG. 10). However, it can be considered less robust in some cases than the single level TAS case, i.e., there is more risk that an intervening network will not be able to route on a nested address.

It should be noted that although the preceding description generally (although not exclusively) describes the use of internal substitution bi-level addressing as being used instead of global bi-level addressing, such is not necessarily the case. Internal substitution bi-level addressing can be used to route calls/signals that would also be routable using global bi-level addressing, although the reverse is not always true.

Additionally, it should be noted that although the preceding description generally (although not exclusively) relies on look-up tables to associate Service Addresses with Internal Routing Addresses, Service Addresses with Network Identifying Codes, and Network Identifying Codes with Internal Routing Addresses, such is not necessarily the case. The same functionality could be achieved by an algorithm that analyzes any of the Addresses or Codes and synthesizes an appropriate corresponding Code or Address. The use of the term "lookup" in the claims includes such algorithms.

Caching of any kind is never necessary, and is not required. Where a function, such as (but not restricted to) caching, is described as taking place in one element of the system, e.g., in one of the ingress device, the local naming system, or otherwise, where a claim does not specifically recite the location of a function, such a claim contemplates that the same function carried out by any element of the system is within the language of the claim.

Thus, according to one aspect of the invention, the system may be characterized as a set of data signals embodied in a propagation medium within a compatible public network, the signals enabling routing of network traffic. Within the set of data signals are a first signal from an ingress capable network device to a local naming system, the local naming system including at least one look-up table having registered pairs of destination address identifiers (either locally "owned" or otherwise) and internal routing addresses internal to the compatible public network. The first signal includes a query structure (as the capable network device queries the naming system) having the destination address identifier embedded therein. A second signal from the local naming system to the capable network device includes a query response structure (as the local naming system responds) having one or more returned internal routing addresses corresponding to the destination address identifier embedded therein (the result of the lookup). A third signal from the ingress capable network device traverses the compatible public network to an egress capable network device at the (e.g., selected) returned internal routing address. The third signal includes routing information determining a path traversing internal network devices of the compatible public network to the returned internal routing address and an address transport structure (e.g., the TAS IE) having the destination address identifier embedded therein. A fourth signal is sent from the egress capable network device, the fourth signal including an addressing structure corresponding to the addressing structure of the original signal (e.g., as the original service address is restored). Optionally, the ingress capable network device is responsive to a signal including an addressing structure having a destination address identifier embedded therein (e.g., the Service Address or network identifying code).

In the case where a global naming system is used, this aspect of the invention considers that a fifth signal (from either the ingress capable network device or the local naming system) can be directed to a global naming system external to the compatible private network when the second signal cannot be formed by the local naming system (i.e., when the look-up is unsuccessful). The fifth signal includes a query structure (for querying the global name server) having the destination address identifier embedded therein, such that the global naming system can respond with a network identifying code resolvable by the local naming system to an internal routing address.

In the case where a bi-lateral arrangement with a "partner" compatible public or private network, this aspect of the invention further considers a partner signal exchanged between the local naming system and a remote local naming system in the second (partner) compatible network. The partner signal includes pairs of destination service addresses internal to the second compatible public network as well as destination compatible network identifying codes for registration in the first compatible public network's naming system look-up table.

According to another aspect of the present invention, the embodiment(s) may be characterized as a method for addressing and directing traffic in a compatible public network. The method includes receiving an original signal (i.e., the setup or other signal addressed with a Service Address) at an ingress capable network device in the compatible public network, the original signal including a destination service address. A destination address identifier, corresponding to the destination service address, is forwarded to a local naming system including at least one look-up table having registered pairs of destination address identifiers and internal routing addresses internal to the compatible public network. A lookup is performed between the destination address identifier and one or more internal routing addresses corresponding thereto. The (e.g., selected) returned internal routing address is returned to the ingress capable network device from the local naming system. The destination address identifier is substituted with the returned internal routing address in a transit signal (i.e., the setup or other signal to be addressed and that is intended to traverse the networks) corresponding to the original signal while retaining the destination address identifier in a separate portion (e.g., the TAS IE) of the transit signal. The transit signal is routed from the ingress capable network device, while traversing the compatible public network, to an egress capable network device at the returned internal routing address. The returned internal routing address is removed from the transit signal at the egress capable network device, and the destination service address is restored to the transit signal. The transit signal is forwarded (e.g., to the next connected interface, end system, or network) from the egress capable network device according to the destination address identifier. Optionally, the original signal includes the destination address identifier in the form of a destination service address embedded therein.

In this aspect of the invention, the method can further include checking, in the local naming system, whether one or more internal routing addresses corresponding to the destination address identifier is present in the registered pairs, and when an internal routing address is not present in the registered pairs, obtaining from the local naming system a destination compatible network identifying code (i.e., the identifying code unique to a compatible public or private network) corresponding to the destination address identifier. A subsequent look-up between the destination compatible network identifying code and an internal routing address corresponding thereto returns an internal routing address to the ingress capable network device. If the local naming system cannot provide the destination compatible network identifying code, a global naming system can be consulted and can provide the destination compatible network identifying code.

A network switch itself, for addressing and directing traffic in a compatible public network, forms another aspect of the present invention. In the case of the ingress border node, the network switch includes one or more interfaces (including, but not limited to, connections, interfaces, or circuits, whether virtual or physical, etc.) for receiving signals having service addresses (i.e., the border connections to other networks, interfaces, and/or end systems). At least one local naming system server interface and/or connection exists, through which a look-up query signal is established with a local naming system server, the look-up query signal being used to determine internal routing addresses corresponding to the service addresses. One or more internal routing and traffic carrying interfaces are provided for routing through the compatible public network, according to the internal routing address, the signals having service addresses. In the case of the egress border node, the network switch includes one or more interfaces for sending signals having service addresses (i.e., the border connections to other networks, interfaces, and/or end systems). One or more internal routing and traffic carrying interfaces receive signals that are routed through the compatible public network according to internal routing addresses internal to the compatible public network. The signals carry the service addresses. The internal routing addresses are removed, and the signals are sent according to the service addresses.

As noted, in the context of the claims, more than one "interface" may be defined through which signals are sent. It is important to note that "interface" in this context does not necessarily denote a physical interface, but may be a virtual interface, virtual circuit, virtual connection, connection or circuit. Moreover, when functions are divided between two or more "interfaces" as recited in any claim, any system or switch in which only one such "interface" carries out the same functions is considered equivalent. Furthermore, when a single function is dedicated to one "interface" as recited in any claim, any system or switch in which two or more "interfaces" share a portion of the function is considered an equivalent.

According to yet another aspect of the present invention, the embodiments can be characterized as a system for addressing and directing traffic in a compatible public network. The system includes a local naming system server, including at least one look-up table having registered pairs of service addresses and internal routing addresses internal to the compatible public network. An ingress capable network device (e.g., a capable network switch or device at the network border) receives an original signal external to the compatible public network and optionally including an addressing structure having a destination service address embedded therein (e.g., a signal addressed with a Service Address). The ingress capable network device includes one or more interfaces for receiving the signals having destination service addresses (e.g., the border connections to other compatible networks, interfaces, and end systems), at least one connection to the local naming system server through which look-up query signals are sent and internal routing addresses corresponding to the destination service addresses are received, and at least one internal routing and traffic carrying connection for routing through the compatible public network, according to the internal routing address, at least transit signals (i.e., setup signals, call signals, and other signals) corresponding to the received signals. The system can include one or more (or a plurality) of intervening network devices through which at least the transit signals are routed through the compatible public network, or the signals can be routed directly from ingress to egress with no intervening devices.

In the case of ATM implementation specifically, the embodiments can be characterized as system for addressing and directing traffic in an ATM service provider network. A local ATM naming system server includes at least one look-up table having registered pairs of ADP service addresses and ATI addresses internal to the ATM service provider network. At least one ingress switch receives an original signal including an ATM address having an ADP service address embedded therein. The (one or more) ingress switch includes one or more interfaces for receiving ATM signals having ADP service addresses, and one or more interfaces to the local ATM naming system server through which look-up query signals are sent and ATI addresses corresponding to the ADP service addresses are received. Additionally, the ingress switch includes one or more internal routing traffic and traffic carrying interfaces for routing through the ATM service provider network, according to the ATI address, at least transit signals corresponding to the received signals. One or more egress switches receive at least the transit signals routed according to the ATI addresses and restore the ADP service addresses before forwarding the transit signals from the ATM service provider network.

An egress capable network device receives at least the transit signals routed according to the internal routing addresses and restores the destination service addresses (e.g., by popping from the TAS IE and promoting the Service Address to the called party number) before forwarding the transit signals from the compatible public network (to a connected compatible network or end system).

The system (and other aspects noted above) can handle internal substitution bi-level addressing alone, or in combination with global bi-level substitution addressing. In either case, the local naming system server can check in the look-up table as to whether one or more internal routing addresses corresponding to the destination service address is present in the registered pairs, and when an internal routing address is not present in the registered pairs, can forward a query to a global naming system, receive a network identifying code, and can either resolve the returned identifying code to an internal routing address (which is returned), or return the network identifying code to the ingress capable network device (in which case the ingress network capable device can again consult the local naming system to obtain an internal routing address). In the case of internal substitution bi-level addressing, the destination service address is optionally replaced with the internal routing address, and routing performed on the internal routing address.

For interconnection to a private network, e.g., a private corporate network, two scenarios are generally possible.

Where the private network uses a public address (i.e., global WAN addresses and User Addresses that are both public and static), the private network can use the public addresses to directly interface with the internal bi-level addressing capable network, i.e., as noted above by look-up via a global naming system. Where the private network uses private or foreign addressing, the destination private address must be translated to a public address, or must be specifically registered in the local naming system, when the call enters the internal substitution bi-level addressing capable network. This NAT operation can be performed by a border switch within the private network, or by the compatible public network. That is, the destination private address is resolved by the NAT operation, or if resolution is impossible, the destination private address can be transported intact, on the assumption that the receiving private network is capable of resolving the destination private address. The internal substitution bi-level addressing network requires only that the destination address be resolvable to the level of the egress port (to the internal routing address, either directly or via a network identification code). However, the private addresses must nevertheless be retained. The private network address can be tunneled or can be pushed onto an appropriate information element in the transport address stack at the appropriate time.

End users substantially directly connecting to a border switch of the compatible public network employing internal bi-level addressing generally, although not exclusively, use a globally unique WAN address as the Service Address for destination addressing, unless the destination address has been registered with the local naming system by other means (or can be resolved by consulting the global naming system). A globally unique WAN address can be assigned by the compatible public network or can be acquired from an authorized source that will supply the address to the local and/or global naming system, so that look-up via the local or global naming system returns a unique mapping.

Interconnection between two compatible public networks that each employ the described internal bi-level addressing requires no special peering agreements. SETUP messages leaving one compatible public network's control have the same calling party number address and called party number address as when they entered the network. These addresses are presented to the next compatible public network in the same manner as to the previous compatible public network. Accordingly, the compatible public network can route independently of other networks, since public network-network interface routing information from one compatible public network is independent of the other compatible public network's public network-network interface routing-table.

Accordingly, internal bi-level addressing can stand alone, or be combined with global bi-level addressing, to extend the capability of a compatible public network to allow services to be carried by that network regardless of addressing requirements. Internal bi-level addressing enables improvements in services deployment, compatible public network interconnection, address portability, and call redirection.

Advantages of the system include the feature that one compatible public network internal substitution addressing scheme can support multiple external WAN addressing requirements. Furthermore, a compatible public network does not require globally unique WAN addresses for internal routing, and therefore more WAN address resources are freed (i.e., more new addresses can be assigned, or old addresses previously used for internal routing can be reassigned, to various entities within the various compatible public networks). Still further, the use of internal bi-level addressing disassociates any dependency between a compatible public network's internal substitution addresses and WAN address, and between WAN addresses and user's end system addresses, increasing flexibility of address assignment for both compatible public network and user network administrators (since the globally unique WAN addresses can be used as a bridge between the compatible public network and user addresses). The system for internal bi-level addressing in public networks allows each public network to operate their network independently of global addressing constraints while offering many features that neither single level addressing nor global bi-level addressing can provide.

For example, public network owners can build a single broadband network using any addressing scheme selected from the appropriate public standard to serve customers who must use a global or WAN addressing scheme that is external to the public network and/or different from that employed therein, which is not possible with single level or global bi-level addressing. Routing tables necessary for public network—network interfacing become smaller, and have superior routing efficiency. Public network—network interfacing is contained within the owner's controlled public network, and this public network becomes autonomous and more robust. Network policy can be more easily managed and retained. Transportability and mobility is facilitated for wireline users. Moreover, using internal bi-level addressing, a global inter-public network, which consists of autonomously managed public networks from around the world, is provided with a foundation for avoiding lengthy peering negotiations.

It should be noted that in all instances herein, the particular architecture and software specified in the embodiments are merely examples. Where alternatives are known, they may be identified herein, but it is intended that hardware and software having essentially similar functions and interacting in the same or a similar manner are considered equivalents. Those skilled in the art can use readily available software and hardware tools to implement the invention discussed herein without undue experimentation.

In accordance with various embodiments of the present invention, the methods described herein are intended for operation as software programs running on a computer processor in an appropriate device. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained transmissible information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Standards for Internet and other packet switched network transmission (e.g., IP, LDAP, DNS) and for public telephone networks (e.g., ATM as described, or alternatively ISDN, B-ISDN, xDSL) represent examples of the state of the art. Such standards are periodically superseded by faster, more capable, or more efficient equivalents having essentially the same functions. In most cases such standards coexist with similar competing and complementary standards and variations of each. Accordingly, competing and complementary standards (as well as variations of explicitly discussed standards and variations of competitor and complementary standards) having the same functions are considered equivalents. Superseding standards, files types, protocols, directory structures, language variations, and/or new generations of each, are also considered equivalents. The terms "standard" or "protocol" are not limited in meaning to public or publicly promulgated concepts, and are inclusive of proprietary and private systems or rules.

It should be noted that not all of the functions and features described in detail herein are necessary for a complete and functional expression of the invention. For example, the system can be used solely for traversing internally addressed public networks, solely for traversing internally addressed private networks, or for any permutation or combination thereof. Further, the system can be used or configured solely for any of the discrete functions described herein, such as local naming system look-up, global naming system look-up, resolution of internal routing addresses from service provider identifying codes, or any combination or permutation thereof. No one or more of the preceding described elements is critical to the operation of the invention, except as explicitly described herein.

Although the above description sets forth particular embodiments of the present invention, modifications of the invention will be readily apparent to those skilled in the art, and the inventors expressly intend that the scope of the invention, as well as elements necessary for the invention to function, be determined solely by the appended claims. Changes may be made, within the purview of the appended claims, as originally submitted and as amended, without departing from the scope and spirit of the invention in its aspects. Although the invention has been described with reference to particular means, materials and embodiments, the inventors do not intend that the invention is to be limited to the particulars disclosed; rather, the invention extends to all equivalent and/or insubstantially different structures, methods and uses such as are within the scope of the appended claims.

What is claimed:

1. A computer readable medium that stores a program in an ingress capable network device of a network for routing signals through the network, the computer readable medium comprising:
   a receiving code segment for receiving an original signal, the original signal comprising an embedded destination service address;
   a querying code segment for querying a database server to obtain an internal routing address corresponding to the embedded destination service address; and
   a routing code segment for routing at least a portion of the original signal through the network to an egress capable network device according to the internal routing address, the routed portion of the original signal including at least the embedded destination service address, enabling the egress capable network device to restore the embedded destination service address and to forward the routed portion of the original signal from the network, wherein the routed portion of the original signal comprises a transit signal.

2. The computer readable medium according to claim 1, in which the network comprises one of a compatible public network or a compatible private network.

3. The computer readable medium according to claim 1, in which the database server comprises a local naming system server.

4. The computer readable medium according to claim 3, in which the local naming system server comprises at least one look-up table having registered pairs of destination address identifiers and internal routing addresses internal to the network.

5. A computer readable medium that stores a program in an ingress capable network device of a network for routing signals through the first network, the computer readable medium comprising:
   a receiving code segment for receiving an original signal, the original signal comprising a destination address identifier corresponding to a destination service address;
   a querying code segment for providing the destination address identifier to a database server and receiving an internal routing address corresponding to the destination address identifier;
   a substituting code segment for substituting the destination address identifier with the internal routing address in a transit signal, the transit signal comprising at least a portion of the original signal and retaining the destination address identifier in a separate portion; and
   a routing code segment for routing the transit signal through the network to an egress capable network device based on the internal routing address, enabling the egress capable network device to restore the destination address identifier from the separate portion of the transit signal, and to forward the transit signal from the network based on the restored destination address identifier.

6. The computer readable medium according to claim 5, in which the original signal comprises a SETUP signal.

7. The computer readable medium according to claim 5, in which the destination address identifier comprises the destination service address.

8. The computer readable medium according to claim 5, in which the database server comprises a local naming system server, including at least one look-up table.

9. The computer readable medium according to claim 8, in which the internal routing address is paired with the destination address identifier in the at least one look-up table.

10. The computer readable medium according to claim 8, in which the internal routing address is paired with a destination compatible network identifying code corresponding to the destination address identifier in the at least one look-up table.

11. The computer readable medium according to claim 10, in which the destination compatible network identifying code is obtained from a second look-up table of the local naming system server.

12. The computer readable medium according to claim 10, in which the destination compatible network identifying code is obtained from a global naming system server, separate from the local naming system server.

13. The computer readable medium according to claim 5, in which the destination compatible network identifying code network comprises a compatible public network.

14. A system for routing signals through a network, the system comprising:
   a database server in the network that stores a plurality of internal routing addresses; and an ingress edge device in the network that receives an original signal comprising a destination address identifier from outside the network, provides the destination address identifier to the database server, receives an internal routing address from the database server corresponding to the destination address identifier, and routes at least a portion of the original signal to an egress edge device in the network based on the internal routing address, the routed portion of the original signal including the destination address identifier;

wherein the egress edge device forwards the routed portion of the original signal outside the network based on the destination address identifier, wherein the routed portion of the original signal comprises a transit signal.

15. The system according to claim 14, in which the database server identifies the internal routing address from among the stored plurality of internal routing addresses by associating the destination address identifier received from the ingress edge device with the internal routing address.

16. The system according to claim 14, in which the database server identifies the internal routing address from among the stored plurality of internal routing addresses by associating the destination address identifier received from the ingress edge device with a destination compatible network identifying code, and then associating the destination compatible network identifying code with the internal routing address.

17. The system according to claim 16, in which the database server associates the destination address identifier with the destination compatible network identifying code by consulting a global database outside the network to obtain the destination compatible network identifying code.

18. The system according to claim 14, in which the original signal comprises a SETUP signal.

19. The system according to claim 14, in which the destination address identifier comprises a destination service address.

* * * * *